: US 10,551,644 B2
(45) Date of Patent: Feb. 4, 2020

(54) MACH-ZEHNDER MODULATOR

(71) Applicant: SUMITOMO ELECTRIC INDUSTRIES, LTD., Osaka (JP)

(72) Inventor: Naoya Kono, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/381,840

(22) Filed: Apr. 11, 2019

(65) Prior Publication Data

US 2019/0353938 A1   Nov. 21, 2019

(30) Foreign Application Priority Data

May 18, 2018   (JP) .................................. 2018-096430

(51) Int. Cl.
| G02F 1/025 | (2006.01) |
| G02F 1/01 | (2006.01) |
| G02F 1/225 | (2006.01) |
| G02F 1/21 | (2006.01) |

(52) U.S. Cl.
CPC .............. G02F 1/025 (2013.01); G02F 1/011 (2013.01); G02F 1/225 (2013.01); G02F 2001/212 (2013.01); G02F 2201/06 (2013.01)

(58) Field of Classification Search
CPC .......... G02F 1/011; G02F 1/025; G02F 1/225; G02F 2001/212; G02F 2201/06
See application file for complete search history.

(56) References Cited

U.S. PATENT DOCUMENTS

| 7,016,555 B2 * | 3/2006 | Ridgway ................. G02F 1/065 385/122 |
| 9,069,223 B2 | 6/2015 | Prosyk |
| 9,140,955 B2 * | 9/2015 | Hoffmann ............... G02F 1/025 |
| 10,031,395 B2 * | 7/2018 | Saito ..................... G02F 1/2257 |
| 2016/0011439 A1 * | 1/2016 | Kitamura ................ G02F 1/218 385/2 |
| 2016/0062155 A1 * | 3/2016 | Ichikawa .............. G02F 1/0316 385/3 |
| 2017/0227828 A1 * | 8/2017 | Nishikawa .......... G02F 1/01708 |

* cited by examiner

*Primary Examiner* — Daniel Petkovsek
(74) *Attorney, Agent, or Firm* — Smith, Gambrell & Russell, LLP.

(57) ABSTRACT

A Mach-Zehnder modulator includes an optical waveguide, first and second arm waveguides, an embedded area, an conductive semiconductor layer, first and second signal upper layers extending over the embedded area and connected to the first and second arm waveguides, a first ground upper layer extending over the embedded area along at least one of the first and the second signal upper layers, a ground lower layer connected to the first ground upper layer and extending through the embedded area along the and second first signal upper layers, and a first conductive upper layer connected to the ground lower layer and extending over the embedded area along at least one of the first and second signal upper layers. The ground lower layer extends between the optical waveguide, the first signal upper layer, and the second signal upper layer.

5 Claims, 14 Drawing Sheets

MACH-ZEHNDER MODULATOR

BACKGROUND OF THE INVENTION

1. Field of the Invention

The present invention relates to a Mach-Zehnder modulator.

2. Description of the Related Art

U.S. Pat. No. 9,069,223 discloses a Mach-Zehnder modulator.

The Mach-Zehnder modulator includes a pair of arm waveguides and a pair of electric signal transmission paths, which are disposed on a base. The arm waveguides are embedded in an embedding insulator. The electric signal transmission paths extend over the embedding insulator, and are connected to the respective arm waveguides to feed high-frequency driving signals to the arm waveguides. The electric signal transmission paths extend over the semiconductor structure, different from the arm waveguides, and the semiconductor structure is also embedded in an insulator.

The electric signal transmission paths are separated from the base with a thick embedding insulator, and separated from the semiconductor structure with a thin embedding insulator. The difference in thickness between the embedding insulators under the electric signal transmission paths varies the transmission characteristics of the electric signal transmission paths.

SUMMARY OF THE INVENTION

An aspect of the present invention aims to provide a Mach-Zehnder modulator that can reduce variance in transmission characteristics.

A Mach-Zehnder modulator according to an aspect of the present invention includes an optical waveguide; a first arm waveguide; a second arm waveguide; an embedded area; an conductive semiconductor layer having the first arm waveguide and the second arm waveguide mounted thereon, the conductive semiconductor layer being connected to the first arm waveguide and the second arm waveguide; a first signal upper layer extending over the embedded area and connected to the first arm waveguide; a second signal upper layer extending over the embedded area and connected to the second arm waveguide; a ground upper layer extending over the embedded area along at least one of the first signal upper layer and the second signal upper layer; a ground lower layer connected to the ground upper layer and extending through the embedded area along the first signal upper layer and the second signal upper layer; and an conductive upper layer connected to the ground lower layer and extending over the embedded area along at least one of the first signal upper layer and the second signal upper layer. The ground lower layer extends between the optical waveguide, the first signal upper layer, and the second signal upper layer.

The above object, other objects, features, and advantages of the present invention will be easily clarified through the following detailed description of preferred embodiments of the present invention with reference to the attached drawings.

DESCRIPTION OF THE PREFERRED EMBODIMENTS

Figure 1:
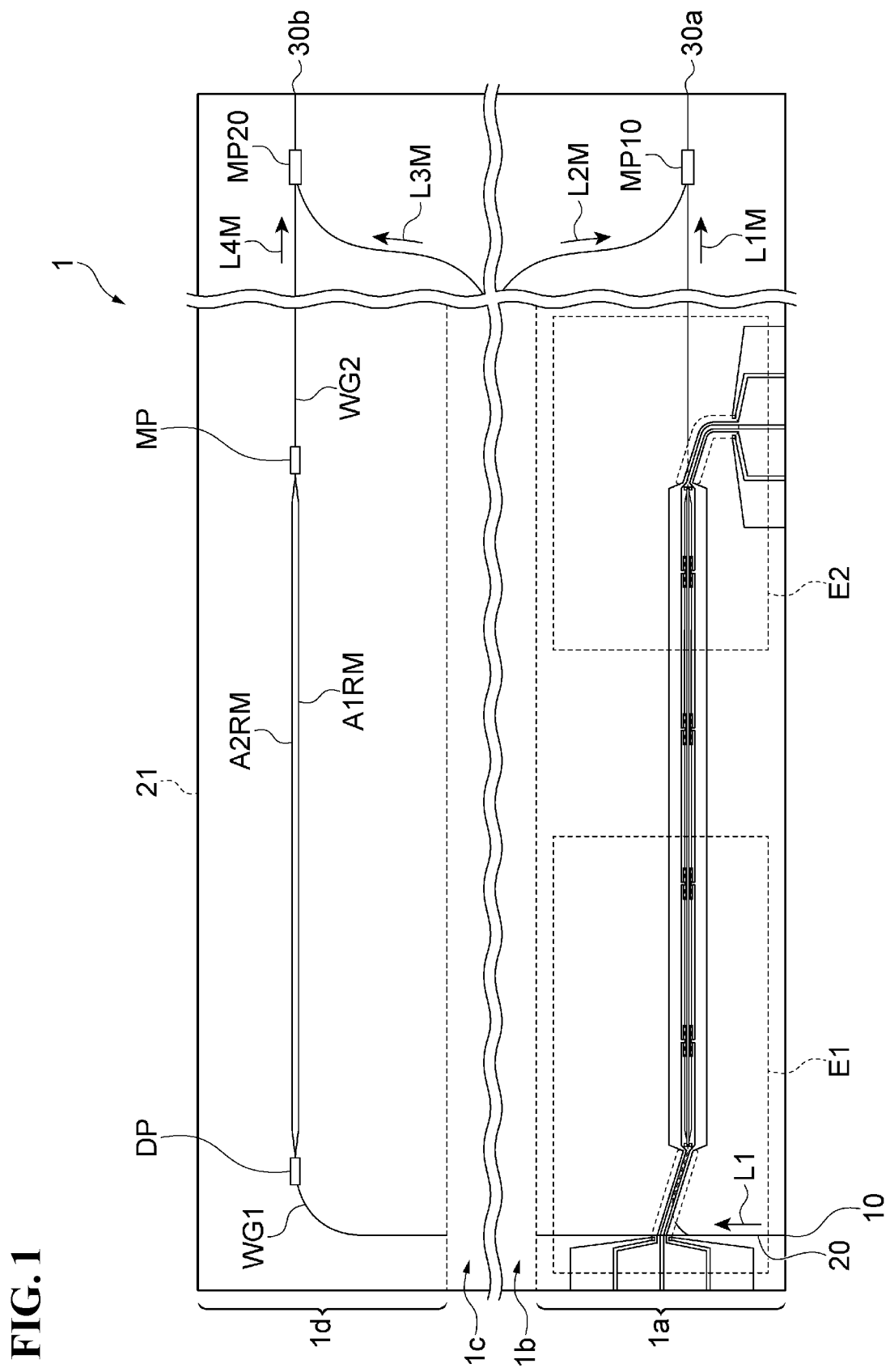
FIG. 1 is a schematic plan view of a Mach-Zehnder modulator according to an embodiment.

Now, some specific examples are described.

A Mach-Zehnder modulator according to a specific example includes (a) an optical waveguide, (b) a first arm waveguide, (c) a second arm waveguide, (d) an embedded area, (e) an conductive semiconductor layer having the first arm waveguide and the second arm waveguide mounted thereon, the conductive semiconductor layer being connected to the first arm waveguide and the second arm waveguide, (f) a first signal upper layer extending over the embedded area and connected to the first arm waveguide, (g) a second signal upper layer extending over the embedded area and connected to the second arm waveguide, (h) a ground upper layer extending over the embedded area along at least one of the first signal upper layer and the second signal upper layer, (i) a ground lower layer connected to the ground upper layer and extending through the embedded area along the first signal upper layer and the second signal upper layer, and (j) an conductive upper layer connected to the ground lower layer and extending over the embedded area along at least one of the first signal upper layer and the second signal upper layer. The ground lower layer extends between the optical waveguide, the first signal upper layer, and the second signal upper layer.

According to this Mach-Zehnder modulator, the ground upper layer is connected to the conductive upper layer with the ground lower layer interposed therebetween. The ground upper layer extends over the embedded area along at least one of the first signal upper layer and the second signal upper layer, and the ground lower layer extends through the embedded area along the first signal upper layer and the second signal upper layer. Here, the level is changed from the ground upper layer to the ground lower layer. Thus, the first signal upper layer and the second signal upper layer can extend along a path over the embedded area, regardless of the path along which the ground lower layer extends through the embedded area. In addition, the ground lower layer extends between the optical waveguide, the first signal upper layer, and the second signal upper layer. Thus, the loss of RF signals transmitted through the first signal upper layer and the second signal upper layer can be reduced.

In a Mach-Zehnder modulator according to a specific example, the ground lower layer has a width greater than a distance between the first signal upper layer and the second signal upper layer.

According to this Mach-Zehnder modulator, the ground lower layer having a width greater than the distance between the first signal upper layer and the second signal upper layer can provide a large ground plane.

The Mach-Zehnder modulator according to a specific example also includes a second ground upper layer. The second ground upper layer extends over the embedded area along at least one of the first signal upper layer and the second signal upper layer. The second ground upper layer is connected to the ground lower layer, together with the first ground upper layer. The first ground upper layer, the first signal upper layer, the second signal upper layer, and the second ground upper layer are arranged in this order over the embedded area. The first signal upper layer and the second signal upper layer are arranged over the embedded area, and the ground lower layer extends through the embedded area. The first signal upper layer, the first conductive upper layer, and the second signal upper layer are arranged in this order over the embedded area.

According to this Mach-Zehnder modulator, an order of arrangement of the first ground upper layer, the first signal upper layer, the second signal upper layer, and the second ground upper layer in the first electric signal input area is changed, in the first light modulation area, into another order of an arrangement of the first signal upper layer, the first conductive upper layer, and the second signal upper layer.

The Mach-Zehnder modulator according to a specific example also includes a second ground upper layer and a second conductive upper layer. The second ground upper layer extends over the embedded area along at least one of the first signal upper layer and the second signal upper layer. The second ground upper layer is connected to the ground lower layer, together with the first ground upper layer. The second conductive upper layer is connected to the ground lower layer, together with the first conductive upper layer, and extends over the embedded area along at least one of the first signal upper layer and the second signal upper layer. The first ground upper layer, the first signal upper layer, the second signal upper layer, and the second ground upper layer are arranged in this order over the embedded area. The first signal upper layer and the second signal upper layer are arranged over the embedded area, and the ground lower layer extends through the embedded area. The first conductive upper layer, the first signal upper layer, the second signal upper layer, and the second conductive upper layer are arranged in this order over the embedded area.

According to this Mach-Zehnder modulator, an order of an arrangement of the first ground upper layer, the first signal upper layer, the second signal upper layer, and the second ground upper layer in the first electric signal input area is changed into another order of an arrangement, in the first light modulation area, into the first conductive upper layer, the first signal upper layer, the second signal upper layer, and the second conductive upper layer.

The Mach-Zehnder modulator according to a specific example also includes a second ground upper layer, a second conductive upper layer, and a third conductive upper layer. The second ground upper layer extends over the embedded area along at least one of the first signal upper layer and the second signal upper layer. The second ground upper layer is connected to the ground lower layer, together with the first ground upper layer. The second conductive upper layer and the third conductive upper layer are connected to the ground lower layer, together with the first conductive upper layer, and extend over the embedded area along at least one of the first signal upper layer and the second signal upper layer. The first ground upper layer, the first signal upper layer, the second signal upper layer, and the second ground upper layer are arranged in this order over the embedded area. The first signal upper layer and the second signal upper layer are arranged over the embedded area, and the ground lower layer extends through the embedded area. The first conductive upper layer, the first signal upper layer, the second conductive upper layer, the second signal upper layer, and the third conductive upper layer are arranged in this order over the embedded area.

According to this Mach-Zehnder modulator, an arrangement of the first ground upper layer, the first signal upper layer, the second signal upper layer, and the second ground upper layer in the first electric signal input area is changed, in the first light modulation area, into an arrangement of the first conductive upper layer, the first signal upper layer, the second conductive upper layer, the second signal upper layer, and the third conductive upper layer.

Findings of the present invention are easily understood in consideration of the following detailed description with reference to attached drawings provided by way of example. A Mach-Zehnder modulator according to embodiments will now be described with reference to the attached drawings. When possible, the same components are denoted with the same reference signs.

Figure 2:
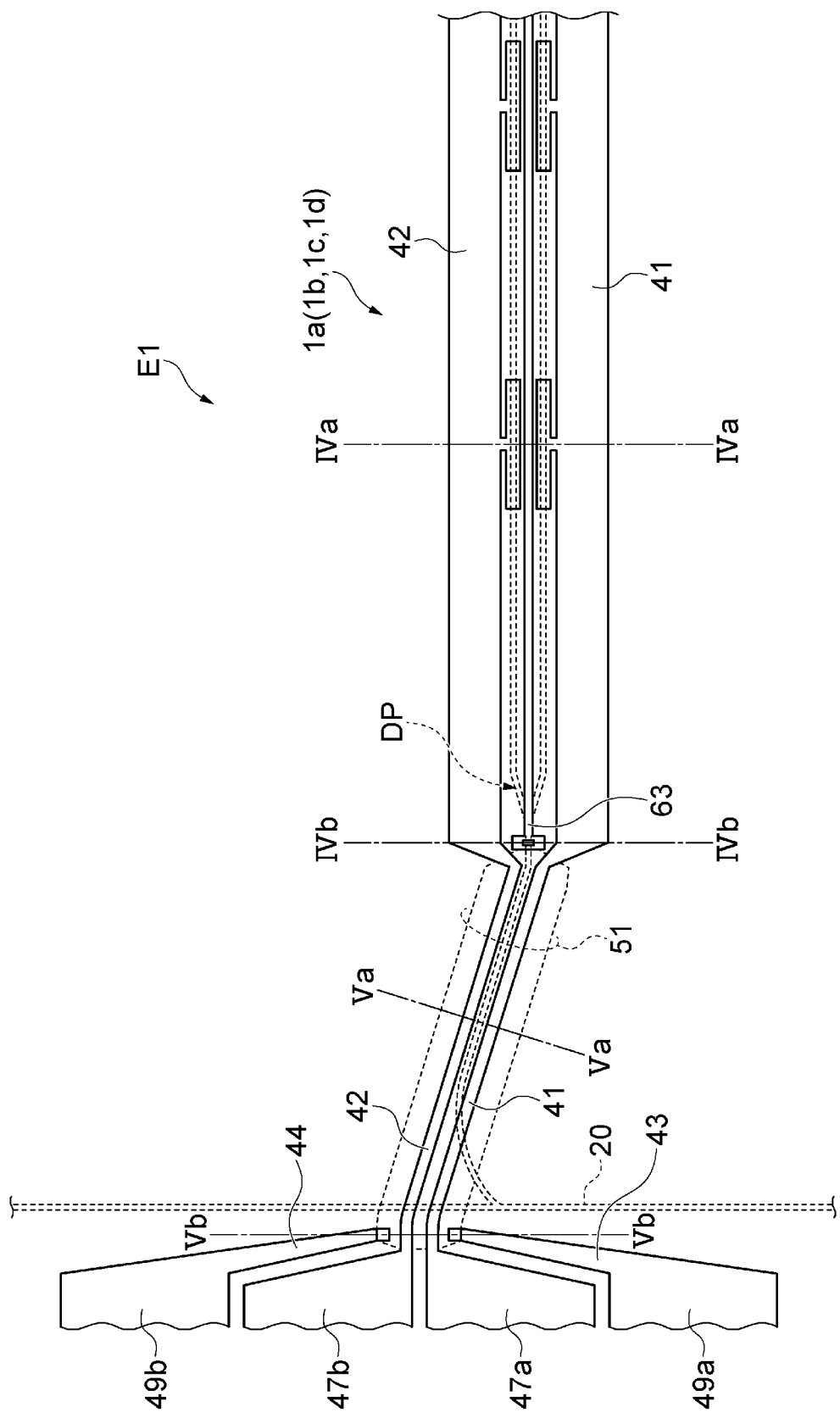
FIG. 2 schematically illustrates an input section, indicated with a broken line in FIG. 1.
Figure 3:
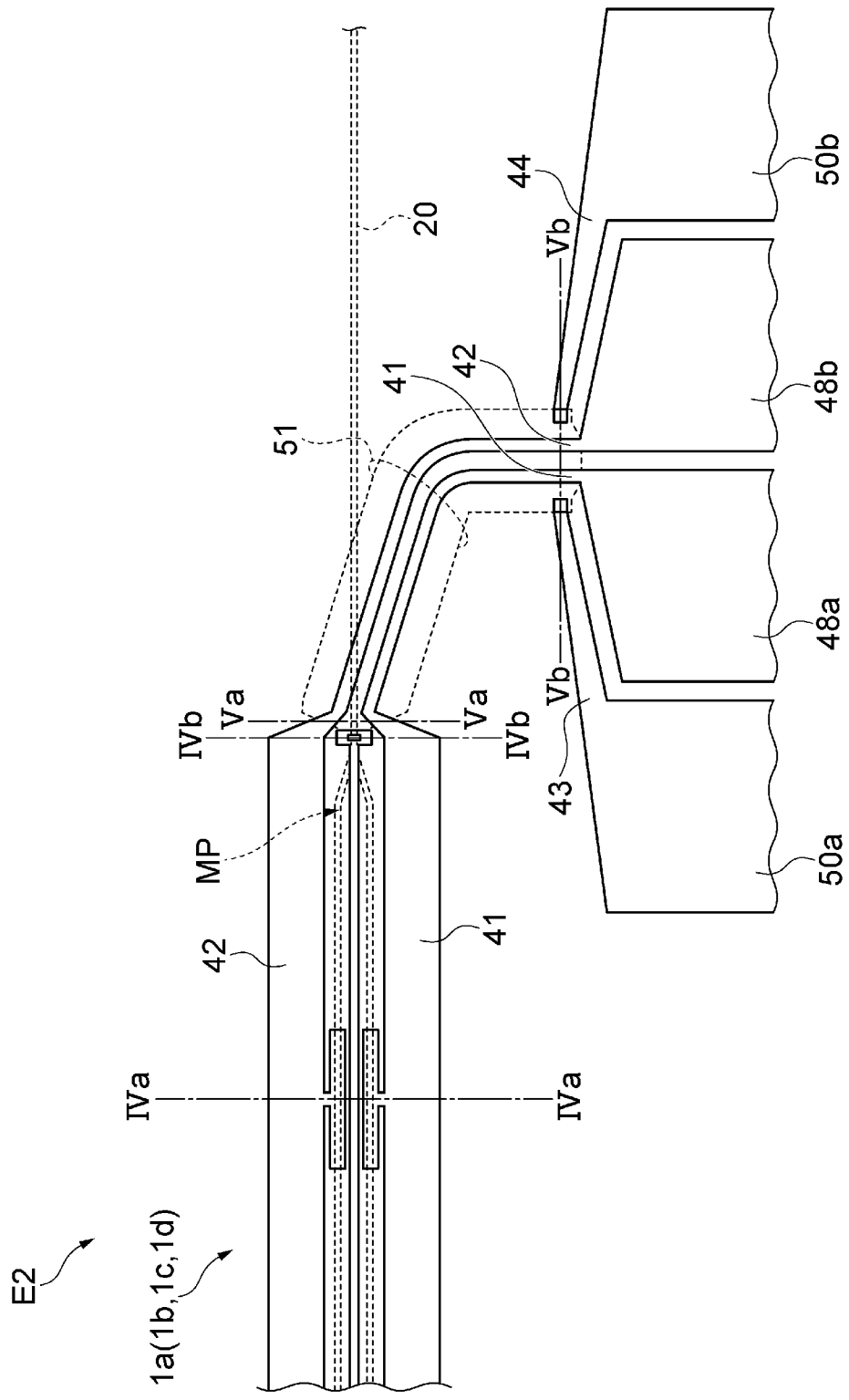
FIG. 3 schematically illustrates an output section, indicated with broken line in FIG. 1.
Figure 4A:
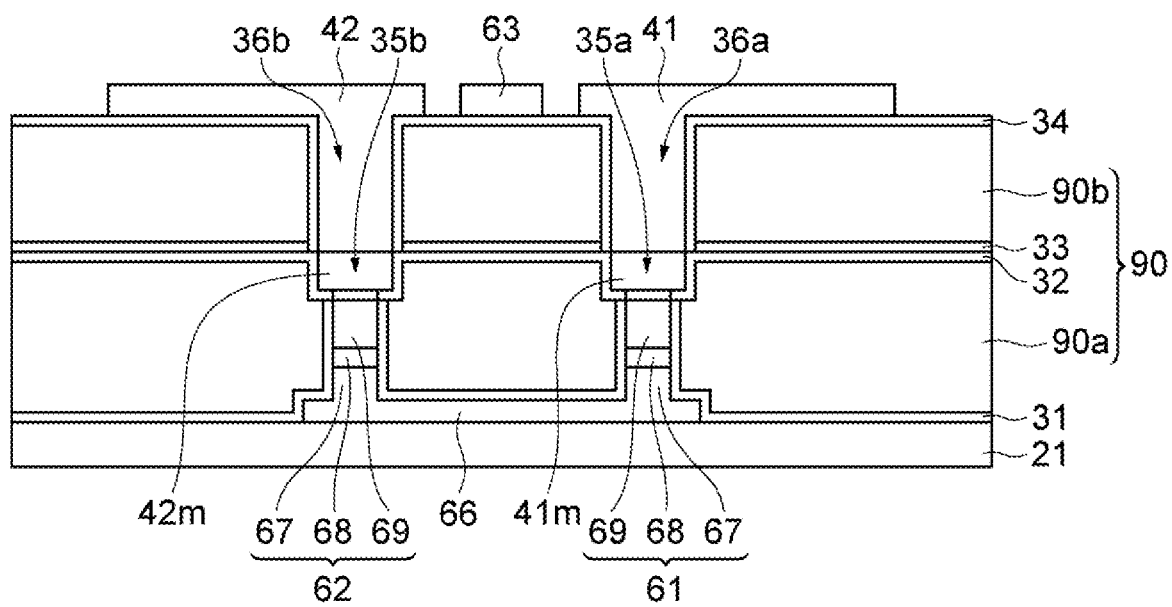
FIG. 4A is a cross-sectional view taken along line IVa-IVa in FIG. 2.
Figure 4B:
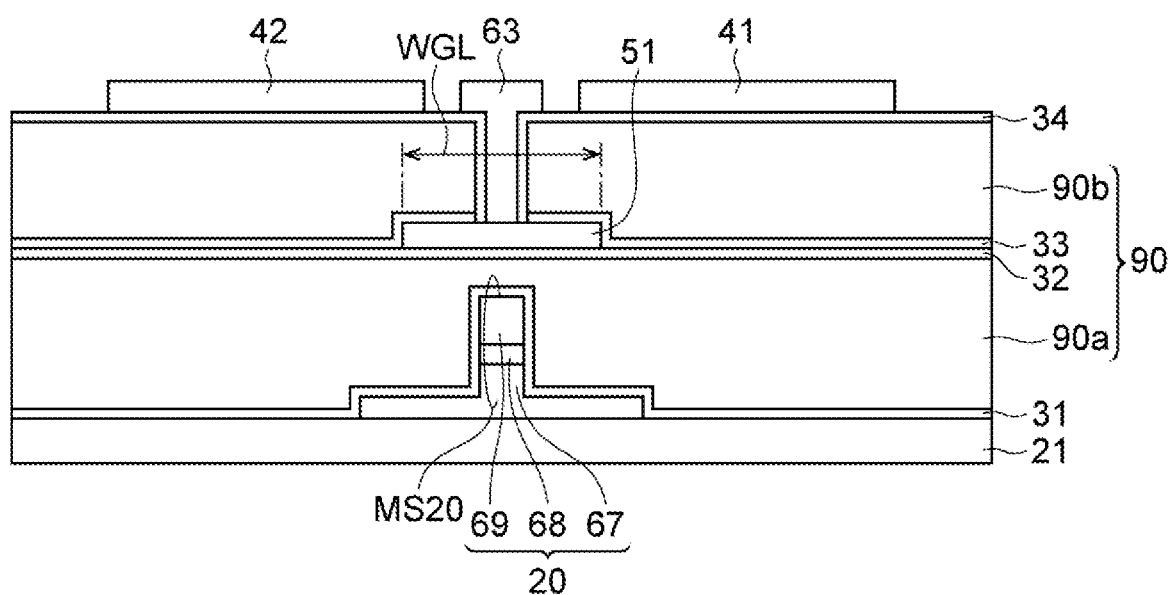
FIG. 4B is a cross-sectional view taken along line IVb-IVb in FIG. 2.
Figure 5A:
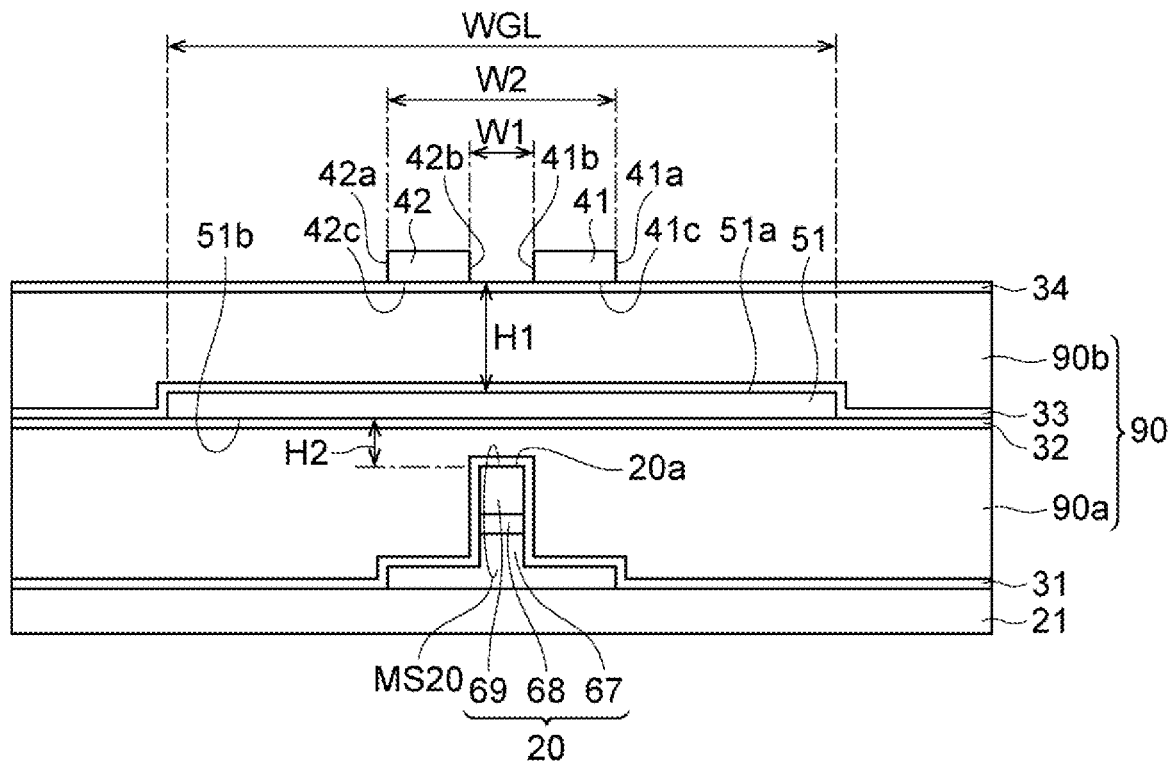
FIG. 5A is a cross-sectional view taken along line Va-Va in FIG. 2.
Figure 5B:
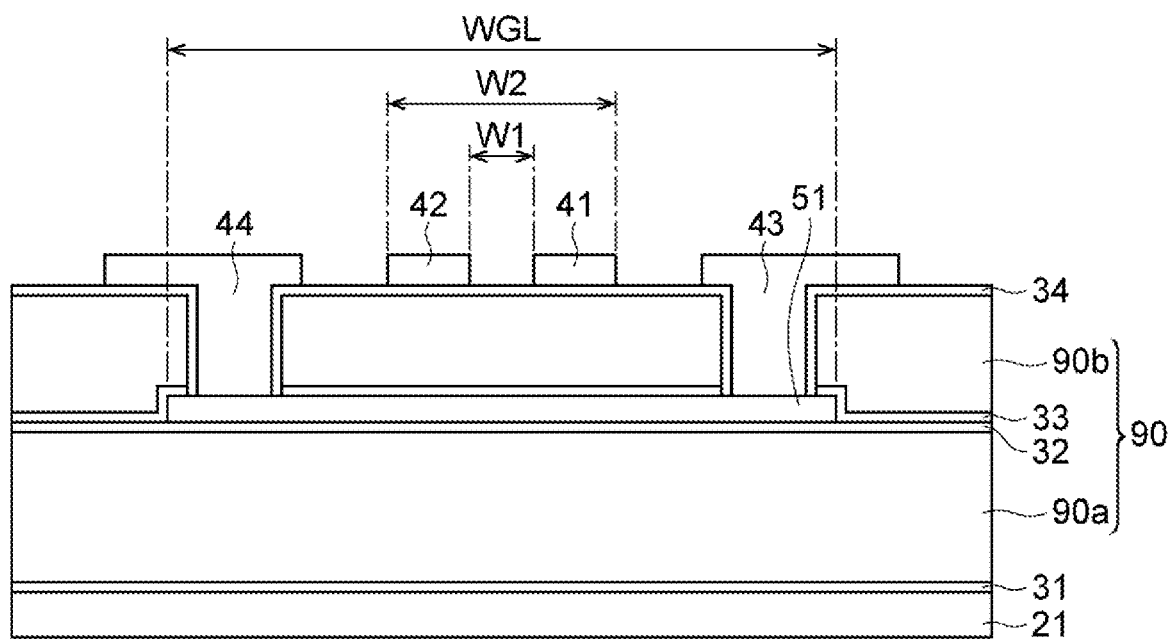
FIG. 5B is a cross-sectional view taken along line Vb-Vb in FIG. 2.

FIG. 1 is a schematic plan view of a Mach-Zehnder modulator according to an embodiment. FIG. 2 schematically illustrates an input section illustrated in FIG. 1. FIG. 3 schematically illustrates an output section illustrated in FIG. 1. FIG. 4A is a cross-sectional view taken along line IVa-IVa in FIG. 2 and FIG. 3. FIG. 4B is a cross-sectional view taken along line IVb-IVb in FIG. 2 and FIG. 3. FIG. 5A is a cross-sectional view taken along line Va-Va in FIG. 2 and FIG. 3. FIG. 5B is a cross-sectional view taken along line Vb-Vb in FIG. 2 and FIG. 3.

With reference to FIG. 1, a Mach-Zehnder modulator 1 includes, for example, a first modulator 1a, a second modulator 1b, a third modulator 1c, and a fourth modulator 1d. In the present embodiment, the first modulator 1a, the second modulator 1b, the third modulator 1c, and the fourth modulator 1d have the same waveguide structure, and thus, the following description is made with reference to the first modulator 1a. With reference to FIG. 1, to illustrate the shapes of the arm waveguide and the optical waveguide connected to multiple modulators, a metal layer for signal transmission of the modulator is not illustrated in the fourth modulator 1d. The Mach-Zehnder modulator 1 includes a base 21, on which the first modulator 1a, the second modulator 1b, the third modulator 1c, and the fourth modulator 1d are mounted. The base 21 may contain, for example, semi-insulating Indium phosphide (InP). The first modulator 1a, the second modulator 1b, the third modulator 1c, and the fourth modulator 1d each include an input waveguide WG1, a divider DP, a first semiconductor arm A1RM, a second semiconductor arm A2RM, a merger MP, and an output waveguide WG2. The divider DP is coupled to the first semiconductor arm A1RM and the second semiconductor arm A2RM to receive continuous light beam from the input waveguide WG1 and to feed the continuous light beam to the first semiconductor arm A1RM and the second semiconductor arm A2RM. The merger MP is coupled to the first semiconductor arm A1RM and the second semiconductor arm A2RM to merge modulated light from the first semiconductor arm A1RM and the second semiconductor arm A2RM, and the merger MP is connected to the output waveguide WG2.

As illustrated in FIG. 2, FIG. 3, FIG. 4A, and FIG. 4B, the Mach-Zehnder modulator 1, or specifically, each of the first modulator 1a, the second modulator 1b, the third modulator 1c, and the fourth modulator 1d includes an optical waveguide 20, a first signal upper layer 41, a second signal upper layer 42, a first ground upper layer 43, a ground lower layer 51, a first arm waveguide 61, a second arm waveguide 62, a first conductive upper layer 63, and an conductive semiconductor layer 66. The first arm waveguide 61 and the second arm waveguide 62 are disposed on the conductive semiconductor layer 66, and connected to each other with the conductive semiconductor layer 66 interposed therebetween. Each of the optical waveguide 20, the conductive semiconductor layer 66, the first arm waveguide 61, and the second arm waveguide 62 has a mesa shape. The Mach-Zehnder modulator 1 also includes an embedded area 90. The embedded area 90 covers the optical waveguide 20, the conductive semiconductor layer 66, the first arm waveguide 61, and the second arm waveguide 62.

As illustrated in FIG. 4A, the first signal upper layer 41 extends over the embedded area 90, and is connected to the first arm waveguide 61 to feed modulation signals to the first arm waveguide 61. The second signal upper layer 42 extends over the embedded area 90, and is connected to the second arm waveguide 62 to feed modulation signals to the second arm waveguide 62. The Mach-Zehnder modulator 1 is driven using differential signals. More specifically, the differential signals propagate over the first signal upper layer 41 and the second signal upper layer 42 to be fed to the first arm waveguide 61 and the second arm waveguide 62. Each of the first arm waveguide 61 and the second arm waveguide 62 changes the phase of light in accordance with the magnitude of the electric field of the received differential signals. In the present embodiment, the conductive semiconductor layer 66 is connected to none of the first signal upper layer 41, the second signal upper layer 42, and the first ground upper layer 43.

The first conductive upper layer 63 may extend along at least one of the first signal upper layer 41 and the second signal upper layer 42. In the present embodiment, the first conductive upper layer 63 extends over the embedded area 90 along the first signal upper layer 41 and the second signal upper layer 42 between the first signal upper layer 41 and the second signal upper layer 42. When needed, the first conductive upper layer 63, the first signal upper layer 41, and the second signal upper layer 42 may be arranged in this order, and the first conductive upper layer 63 may extend along the first signal upper layer 41. Alternatively, the first conductive upper layer 63, the second signal upper layer 42, and the first signal upper layer 41 may be arranged in this order, and the first conductive upper layer 63 may extend along the second signal upper layer 42. Over the conductive semiconductor layer 66, the first conductive upper layer 63 extends along the first arm waveguide 61 and the second arm waveguide 62.

FIG. 4B illustrates a cross-sectional view at a first end of the ground lower layer 51. As illustrated in FIG. 4B, in the present embodiment, the first conductive upper layer 63 is connected to the first end of the ground lower layer 51 at a first end (FIG. 2) and/or a second end (FIG. 3) of the first modulator 1a. The ground lower layer 51 extends through the embedded area 90 along the first signal upper layer 41 and the second signal upper layer 42. In the present embodiment, this connection is spaced apart from the divider DP, the first semiconductor arm A1RM, the second semiconductor arm A2RM, and the input waveguide WG1 of the first modulator 1a. However, the connection between the first conductive upper layer 63 and the ground lower layer 51 is not limited thereto. For example, the first conductive upper layer 63 and the ground lower layer 51 may be connected together on or around the optical waveguide for the input waveguide WG1. The ground lower layer 51 is independent from the arrangement of the optical waveguide 20, the first arm waveguide 61, and the second arm waveguide 62.

As illustrated in FIG. 5A, the ground lower layer 51 is disposed between the optical waveguide 20 and the first and the second signal upper layers 41, 42. The embedded area 90 fills the gap between the ground lower layer 51 and the optical waveguide 20.

FIG. 5B illustrates a cross-sectional view at a second end of the ground lower layer 51. As illustrated in FIG. 5B, the first ground upper layer 43 is connected to the second end of the ground lower layer 51. The first ground upper layer 43 extends along at least one of the first signal upper layer 41 and the second signal upper layer 42, in the present embodiment, the first ground upper layer 43 extends over the embedded area 90 along the first signal upper layer 41 and the second signal upper layer 42. When needed, the first ground upper layer 43, the first signal upper layer 41, and the second signal upper layer 42 may be arranged in this order, and the first ground upper layer 43 may extend along the first signal upper layer 41. Alternatively, the first signal upper layer 41, the second signal upper layer 42, and the first ground upper layer 43 may be arranged in this order, and the first ground upper layer 43 may extend along the second signal upper layer 42.

The ground lower layer 51 extends through the embedded area 90, and the first ground upper layer 43 extends over the embedded area 90. The first ground upper layer 43 and the ground lower layer 51 are connected to each other to change a wiring level from an upper surface of the base 21. The wiring level is a height of the wire layer. Specifically, the first ground upper layer 43 and the ground lower layer 51 are vertically connected so as to change their heights from the upper surface of the base 21. The ground lower layer 51 in the embedded area 90 is in contact with none of the optical waveguide 20, the first arm waveguide 61, and the second arm waveguide 62.

According to the Mach-Zehnder modulator 1, the first ground upper layer 43 is connected to the first conductive upper layer 63 with the ground lower layer 51 interposed therebetween. The first ground upper layer 43 extends along at least one of the first signal upper layer 41 and the second signal upper layer 42. The ground lower layer 51 extends through the embedded area 90 along the first signal upper layer 41 and the second signal upper layer 42. The wiring level is changed from the first ground upper layer 43 to the ground lower layer 51. The first signal upper layer 41 and the second signal upper layer 42 can extend along the path over the embedded area 90 of the upper layers, instead of along the path along which the ground lower layer 51 extends through the embedded area 90. The ground lower layer 51 extends between the optical waveguide 20 and the first and second signal upper layers 41, 42. Thus, the loss of radio frequency (RF) signals transmitted through the first signal upper layer 41 and the second signal upper layer 42 is reduced.

With reference back to FIG. 1, the Mach-Zehnder modulator 1 also includes a light inlet port 10, a first light outlet port 30a, and a second light outlet port 30b.

The light inlet port 10 receives input light L1 from the exterior. The input light L1 propagates through the optical waveguide 20. In the present embodiment, the optical waveguide 20 provides the input light L1 to the first modulator 1a, the second modulator 1b, the third modulator 1c, and the fourth modulator 1d using one or more light dividers.

Specifically, in response to the respective modulation signals, the first modulator 1a, the second modulator 1b, the third modulator 1c, and the fourth modulator 1d modulate the divided input light L1 to respectively generate a modulated light beam L1M, a modulated light beam L2M, a modulated light beam L3M, and a modulated light beam L4M. The modulated light beam L1M and the modulated light beam L2M are merged by a merger (MP10) and fed to the first light outlet port 30a. The modulated light beam L3M and the modulated light beam L4M are merged by a merger (MP20) and fed to the first light outlet port 30a and the second light outlet port 30b. The first conductive upper layer 63, the ground lower layer 51, and the first ground upper layer 43 are arranged in this order. This arrangement may extend along at least one of the first signal upper layer 41 and the second signal upper layer 42. The first conductive upper layer 63, the ground lower layer 51, and a second ground upper layer 44 are arranged in this order. This arrangement may extend along at least one of the first signal upper layer 41 and the second signal upper layer 42.

With reference back to FIG. 2, in the input section E1, the first signal upper layer 41 and the second signal upper layer 42 are respectively connected to a first input pad electrode 47a and a second input pad electrode 47b. The first ground upper layer 43 and the second ground upper layer 44 are respectively connected to a first ground pad electrode 49a and a second ground pad electrode 49b.

With reference back to FIG. 3, in the output section E2, the first signal upper layer 41 and the second signal upper layer 42 are respectively connected to a first terminal pad electrode 48a and a second terminal pad electrode 48b. The first ground upper layer 43 and the second ground upper layer 44 are respectively connected to a first ground pad electrode 50a and a second ground pad electrode 50b. When needed, the conductive semiconductor layer 66 may receive electricity from a power source independent from the potential of the first signal upper layer 41, the potential of the second signal upper layer 42, and the ground potential.

With reference to FIG. 4A to FIG. 5B, the Mach-Zehnder modulator 1 is described further in detail.

As illustrated in FIG. 4A to FIG. 5B, the embedded area 90 includes a lower embedded area 90a and an upper embedded area 90b. The lower embedded area 90a is disposed on the base 21. The lower embedded area 90a has the first arm waveguide 61 and the second arm waveguide 62 embedded therein, and other waveguide structures of the Mach-Zehnder modulator 1 embedded therein, specifically, Mach-Zehnder interferometer (MZI) waveguide structures for the input waveguide WG1, the divider DP, the merger MP, and the output waveguide WG2. The embedded area 90 may include a first inorganic insulator film 31, which covers MZI waveguide structures for the divider DP and the merger MP, the first arm waveguide 61, the second arm waveguide 62, and the conductive semiconductor layer 66. The lower embedded area 90a is disposed on the first inorganic insulator film 31 to cover the MZI waveguide structures, the first arm waveguide 61, the second arm waveguide 62, and the conductive semiconductor layer 66 in order for the lower embedded area 90a to have a level resin surface. Besides the first inorganic insulator film 31 between the lower embedded area 90a and the base 21, the embedded area 90 also includes a second inorganic insulator film 32 on the lower embedded area 90a.

The ground lower layer 51 is disposed on the second inorganic insulator film 32, and, in the present embodiment, in contact with the second inorganic insulator film 32. The embedded area 90 also includes a third inorganic insulator film 33 disposed on the second inorganic insulator film 32. The embedded area 90 includes the upper embedded area 90b disposed on the third inorganic insulator film 33, and a fourth inorganic insulator film 34 disposed on the upper embedded area 90b. The third inorganic insulator film 33 and the upper embedded area 90b cover the ground lower layer 51 in order for the upper embedded area 90b to have a level resin surface. In the present embodiment, the third inorganic insulator film 33 is in contact with the ground lower layer 51. The first signal upper layer 41, the second signal upper layer 42, the first ground upper layer 43, and the first conductive upper layer 63 extend over the fourth inorganic insulator film 34.

As illustrated in FIG. 4A, the first inorganic insulator film 31, the lower embedded area 90a, and the second inorganic insulator film 32 have a first opening 35a and a second opening 35b. The first opening 35a and the second opening 35b are located over the first arm waveguide 61 and the second arm waveguide 62. In the present embodiment, the Mach-Zehnder modulator 1 may include a first lower conductor 41m and a second lower conductor 42m. The first lower conductor 41m is disposed between the first signal upper layer 41 and the first arm waveguide 61 and in contact with the first signal upper layer 41 and the first arm waveguide 61. The second lower conductor 42m is disposed between the second signal upper layer 42 and the second arm waveguide 62 and in contact with the second signal upper layer 42 and the second arm waveguide 62.

The third inorganic insulator film 33, the upper embedded area 90b, and the fourth inorganic insulator film 34 include a first opening 36a and a second opening 36b. The first opening 36a and the second opening 36b are disposed over the first arm waveguide 61 and the second arm waveguide 62. In the Mach-Zehnder modulator 1 according to the present embodiment, the first signal upper layer 41 and the second signal upper layer 42 are respectively connected to the first lower conductor 41*m* and the second lower conductor 42*m* through the first opening 36*a* and the second opening 36*b*.

As illustrated in FIG. 4A, the first arm waveguide 61 and the second arm waveguide 62 are disposed on the conductive semiconductor layer 66. The conductive semiconductor layer 66 is disposed between the first arm waveguide 61 and the second arm waveguide 62, and connected to the first arm waveguide 61 and the second arm waveguide 62.

As illustrated in FIG. 4A and FIG. 5A, each of the optical waveguide 20, the first arm waveguide 61, and the second arm waveguide 62 includes a first conductive semiconductor layer 67, a core layer 68, and a second conductive semiconductor layer 69. The core layer 68 is disposed between the first conductive semiconductor layer 67 and the second conductive semiconductor layer 69. Each of the first conductive semiconductor layer 67 and the second conductive semiconductor layer 69 includes a lower cladding and an upper cladding. The surfaces of the optical waveguide 20, the first arm waveguide 61, the second arm waveguide 62, and the base 21 are embedded in the first inorganic insulator film 31.

As illustrated in FIG. 4B, FIG. 5A, and FIG. 5B, the ground lower layer 51 may provide a ground plane having a ground potential for the first signal upper layer 41, the second signal upper layer 42, and the base 21. The ground lower layer 51 preferably has a width larger than a distance between the first signal upper layer 41 and the second signal upper layer 42. The ground lower layer 51 having a width WGL larger than a distance between the first signal upper layer 41 and the second signal upper layer 42 can provide a large ground plane for the first signal upper layer 41, the second signal upper layer 42, and the base 21.

As illustrated in FIG. 5A and FIG. 5B, the first signal upper layer 41 has an outer side 41*a* and an inner side 41*b*, which define the width of the first signal upper layer 41. The second signal upper layer 42 has an outer side 42*a* and an inner side 42*b*, which define the width of the second signal upper layer 42. The width WGL of the ground lower layer 51 is preferably larger than or equal to the distance (W1) between the inner side 41*b* of the first signal upper layer 41 and the inner side 42*b* of the second signal upper layer 42. More preferably, the width WGL of the ground lower layer 51 is larger than or equal to the distance (W2) between the outer side 41*a* of the first signal upper layer 41 and the outer side 42*a* of the second signal upper layer 42. A distance H1 from an upper surface 51*a* of the ground lower layer 51 to a lower surface 41*c* of the first signal upper layer 41 or a lower surface 42*c* of the second signal upper layer 42 falls within a range of 0.5 to 5 micrometers. A distance H2 from an upper surface 20*a* of the optical waveguide 20 to a lower surface 51*b* of the ground lower layer 51 falls within a range of 0.2 to 2 micrometers.

In the Mach-Zehnder modulator 1, the ground lower layer 51 having a width larger than the distance between the first signal upper layer 41 and the second signal upper layer 42 can provide a ground plane. This provision of the ground plane can reduce the difference in transmission properties and reflectance properties of the RF signals caused by the presence or absence of the intersection of the optical waveguide and the signal upper layer. Specifically, when the optical waveguide includes a conductive semiconductor layer, the wide ground plane reduces the degeneracy of the transmission and reflectance properties of the RF signals which is caused by the existence of the optical waveguide below the signal upper layers.

Examples of the components of the Mach-Zehnder modulator 1 are as follows:
the first signal upper layer 41 and the second signal upper layer 42 formed from gold;
the first ground upper layer 43 formed from gold;
the ground lower layer 51 formed from gold;
the first conductive upper layer 63 formed from gold;
the base 21 formed from semi-insulating InP;
the embedded area 90 formed from bisbenzocyclobutene (BCB) resin and a silicon-based inorganic insulator film;
the first arm waveguide 61, the second arm waveguide 62, and the optical waveguide 20;
the first conductive semiconductor layer 67 formed from an n-InP layer;
the core layer 68 formed from an i-AlGaInAs layer;
the second conductive semiconductor layer 69 formed from a p-InP layer; and
the conductive semiconductor layer 66 formed from an n-InP layer.

Embodiment

Figure 6A:
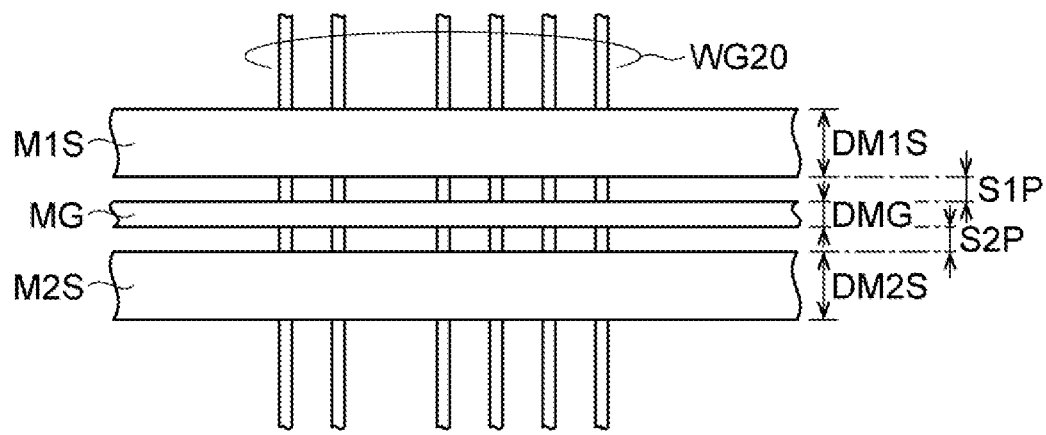
FIG. 6A is a schematic plan view of a metal layer and an optical waveguide in a first simulation model excluding a ground lower layer.

FIG. 6A is a plan view schematically illustrating a metal layer and an optical waveguide of a first simulation model excluding a ground lower layer. An optical waveguide structure WG20 includes six waveguide mesas embedded in the embedded area, and a first signal upper layer M1S and a second signal upper layer M2S extend over the optical waveguide structure WG20. The first signal upper layer M1S has a width DM1S of 58 micrometers. A first conductive upper layer MG has a width DMG of 5 micrometers. The second signal upper layer M2S has a width DM2S of 58 micrometers. In the first simulation model, the first signal upper layer M1S and the first conductive upper layer MG are spaced by a distance S1P of 8 micrometers. The second signal upper layer M2S and the first conductive upper layer MG are spaced by a distance S2P of 8 micrometers. The lower surfaces of the first signal upper layer M1S, the first conductive upper layer MG, and the second signal upper layer M2S and the upper surface of the optical waveguide WG20 are spaced by a distance of 1 micrometer. A second simulation model includes a ground lower layer in place of the first conductive upper layer MG. In the second simulation model, the distance from the first signal upper layer M1S to the second signal upper layer M2S is 10 micrometers. The first conductive upper layer MG has a width DMG of 0 micrometers. The ground lower layer has a width of 50 micrometers. The distance from the upper surface of the ground lower layer to the upper surface of the upper embedded area falls within a range of 0.5 to 5 micrometers.

Figure 6B:
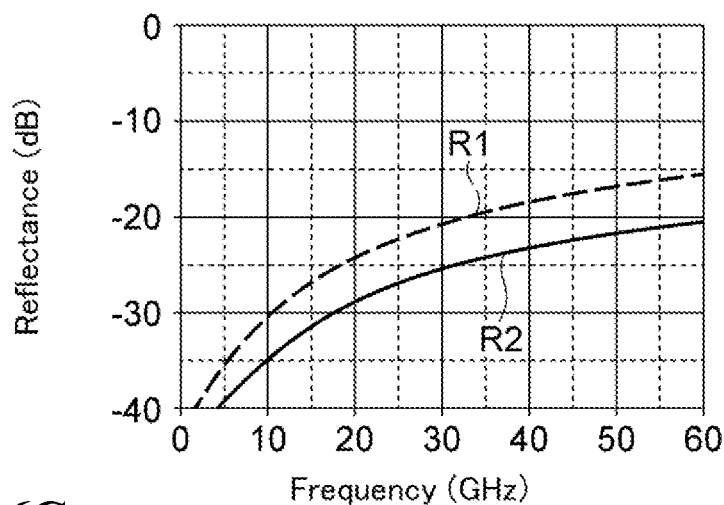
FIG. 6B illustrates reflectance properties associated with the existence/absence of a ground lower layer.

FIG. 6B illustrates the reflectance properties of RF signals in the first model (R1) and the second model (R2). The horizontal axis indicates the frequency range, and the vertical axis indicates the reflectance of RF signals. The ground lower layer in the second model reduces the reflectance of the RF signals in the range of 5 GHz to 60 GHz.

Figure 6C:
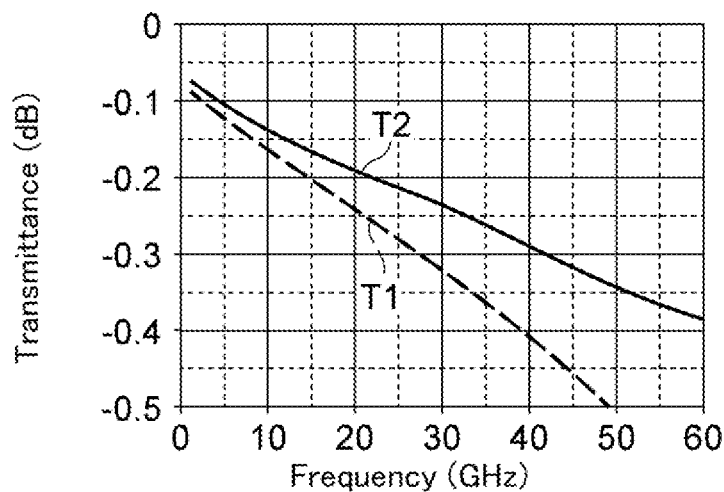
FIG. 6C illustrates transmission properties associated with the existence/absence of a ground lower layer.

FIG. 6C illustrates the transmission properties of RF signals in the first model (T1) and the second model (T2). The horizontal axis indicates the frequency range, and the vertical axis indicates transmittance of RF signals. The ground lower layer in the second model facilitates transmittance of RF signals.

Figure 7A:
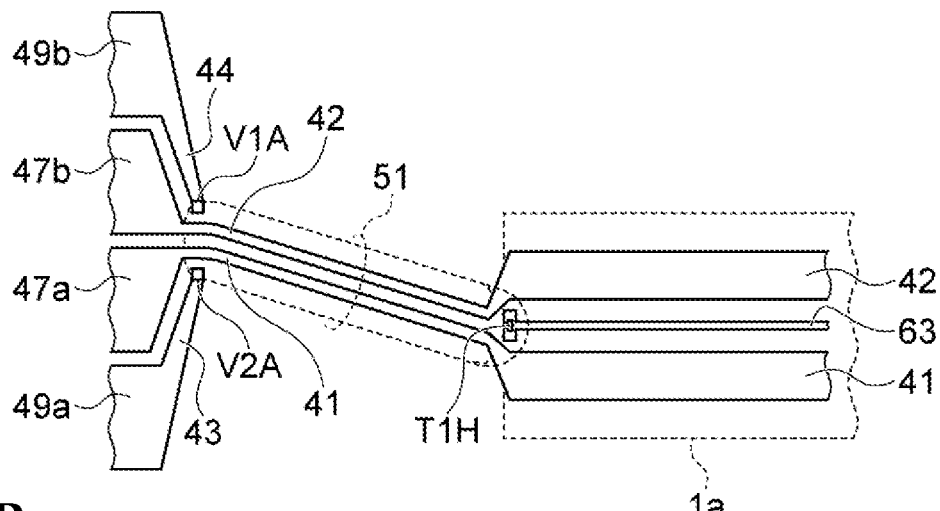
FIG. 7A illustrates a change of an arrangement of signal lines and ground conductors in an input section and an output section.
Figure 7B:
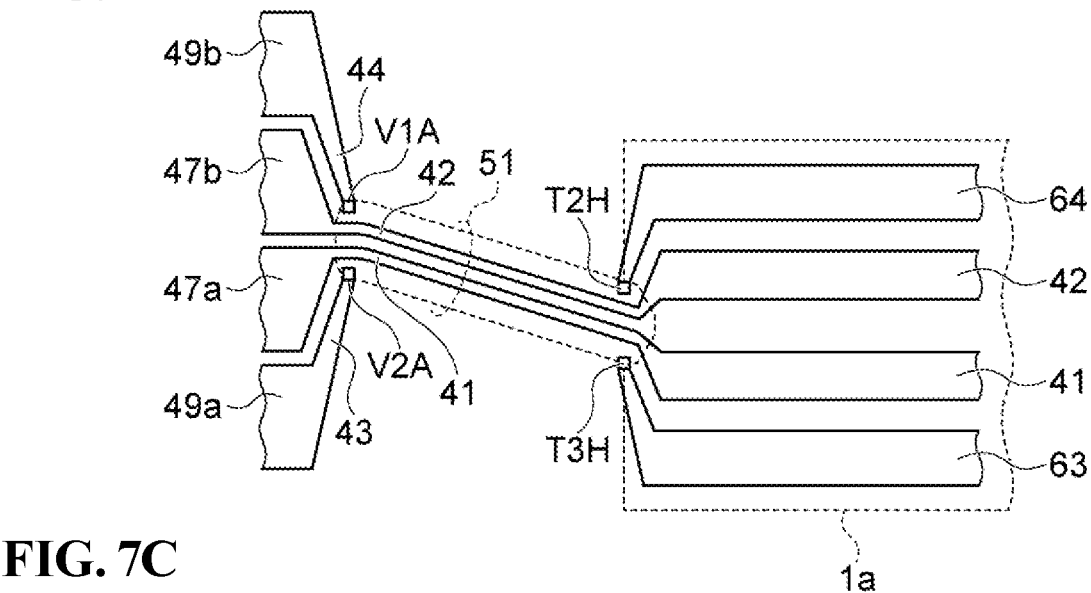
FIG. 7B illustrates a change of an arrangement of signal lines and ground conductors in an input section and an output section.
Figure 7C:
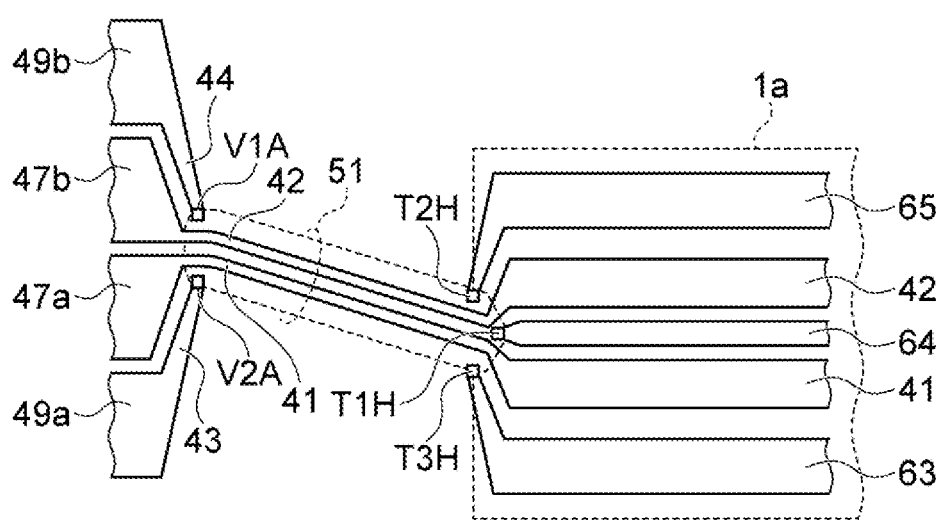
FIG. 7C illustrates a change of an arrangement of signal lines and ground conductors in an input section and an output section.

FIGS. 7A, 7B, and 7C illustrate three types of changes of arrangement of signal lines and ground conductors commonly used both in the input section and the output section.

With reference to FIG. 7A, as described above, the Mach-Zehnder modulator 1 includes the first signal upper layer 41 and the second signal upper layer 42 respectively extending along the first arm waveguide 61 and the second arm waveguide 62. The differential signals on the first signal upper layer 41 and the second signal upper layer 42 respectively drive the first arm waveguide 61 and the second arm waveguide 62. The differential signals from the driver are fed, in accordance with the arrangement of the signal lines and the ground conductors of the driver, to input pads connected to the first ground upper layer 43, the first signal upper layer 41, the second signal upper layer 42, and the second ground upper layer 44 of the Mach-Zehnder modulator 1. The first ground upper layer 43 and the second ground upper layer 44 are connected to the common wide ground lower layer 51. The first signal upper layer 41 and the second signal upper layer 42 extend over the wide ground lower layer 51 toward the first modulator 1a. The wide ground lower layer 51, the first signal upper layer 41, and the second signal upper layer 42 can form a transmission path similar to a microstrip line. At the first end (the input section) of the first modulator 1a, the ground lower layer 51 is connected to a single first conductive upper layer 63 through a through-hole T1H. The first conductive upper layer 63 extends along the first arm waveguide 61 and the second arm waveguide 62 between the first signal upper layer 41 and the second signal upper layer 42. At the second end (the output section) of the first modulator 1a, the first conductive upper layer 63 is connected to the common wide ground lower layer 51, and the first signal upper layer 41 and the second signal upper layer 42 extend over the wide ground lower layer 51 toward pads for the terminals. Around the pad electrodes, the ground lower layer 51 is connected to the first ground upper layer 43 and the second ground upper layer 44 through through-holes VIA and V2A. The first ground upper layer 43, the first signal upper layer 41, the second signal upper layer 42, and the second ground upper layer 44 are connected to pad electrodes for terminals.

At the position of the input pads, the signal lines and the ground conductors are arranged in order of the first ground upper layer 43, the first signal upper layer 41, the second signal upper layer 42, and the second ground upper layer 44. This arrangement is referred to as a "ground-signal-signal-ground (GSSG) arrangement". In the first modulator 1a, the signal lines and the ground conductors are arranged in order of the first signal upper layer 41, the first conductive upper layer 63, and the second signal upper layer 42. This arrangement is referred to as a "signal-ground-signal (SGS) arrangement". The GSSG arrangement from the driver is changed to the SGS arrangement in the input section E1.

With reference to FIG. 7B, the Mach-Zehnder modulator 1 includes the first signal upper layer 41 and the second signal upper layer 42, which respectively extend along the first arm waveguide 61 and the second arm waveguide 62. The Mach-Zehnder modulator 1 also includes the first conductive upper layer 63 and the second conductive upper layer 64. The first signal upper layer 41 and the second signal upper layer 42 extend between the first conductive upper layer 63 and the second conductive upper layer 64. The ground lower layer 51 is connected to the first conductive upper layer 63 and the second conductive upper layer 64 through through-holes T2H and T3H. The differential signals on the first signal upper layer 41 and the second signal upper layer 42 respectively drive the first arm waveguide 61 and the second arm waveguide 62. As described above, the differential signals from the driver are fed, in accordance with the arrangement of the signal lines and the ground conductors of the driver, to input pads connected to the first ground upper layer 43, the first signal upper layer 41, the second signal upper layer 42, and the second ground upper layer 44 of the Mach-Zehnder modulator 1. Around the pad electrodes, the ground lower layer 51 is connected to the first ground upper layer 43 and the second ground upper layer 44 through through-holes V1A and V2A. In the first modulator 1a, the signal lines and the ground conductors are arranged in order of the first conductive upper layer 63, the first signal upper layer 41, the second signal upper layer 42, and the second conductive upper layer 64. This arrangement is referred to as a "GSSG arrangement". The GSSG arrangement from the driver is connected to the GSSG arrangement in the input section E1.

With reference to FIG. 7C, the Mach-Zehnder modulator 1 includes the first signal upper layer 41 and the second signal upper layer 42, which respectively extend along the first arm waveguide 61 and the second arm waveguide 62, and also includes the first conductive upper layer 63, the second conductive upper layer 64, and the third conductive upper layer 65. The differential signals on the first signal upper layer 41 and the second signal upper layer 42 respectively drive the first arm waveguide 61 and the second arm waveguide 62. The ground lower layer 51 is connected to the first conductive upper layer 63, the second conductive upper layer 64, and the third conductive upper layer 65 through through-holes T1H, T2H, and T3H. As described above, the differential signals from the driver are fed, in accordance with the arrangement of the signal lines and the ground conductors of the driver, to input pads connected to the first ground upper layer 43, the first signal upper layer 41, the second signal upper layer 42, and the second ground upper layer 44 of the Mach-Zehnder modulator 1. Around the pad electrodes, the ground lower layer 51 is connected to the first ground upper layer 43 and the second ground upper layer 44 through through-holes V1A and V2A. In the first modulator 1a, the signal lines and the ground conductors are arranged in order of the first conductive upper layer 63, the first signal upper layer 41, the second conductive upper layer 64, the second signal upper layer 42, and a third conductive upper layer 65. This arrangement is referred to as a "ground-signal-ground-signal-ground (GSGSG) arrangement".

As understood from these descriptions, in the input section and the output section, using the ground lower layer 51 enables any of "the SGS arrangement", "the GSSG arrangement", and "the GSGSG arrangement" to be connected to one of "the SGS arrangement", "the GSSG arrangement", and "the GSGSG arrangement". The GSSG arrangement from the driver is changed to the GSGSG arrangement in the input section E1.

With reference to FIG. 8 to FIG. 14, main steps in the method for manufacturing a Mach-Zehnder modulator are described. When possible, reference sings used in the description with reference to FIG. 1 to FIG. 5C are used for easy of understanding.

In the following description, manufacture of a product having a cross section taken along line IVa-IVa illustrated in FIG. 2 is described with reference to the steps illustrated in FIG. 8A to FIG. 14A, manufacture of a product having a cross section taken along line IVb-IVb illustrated in FIG. 2 is described with reference to the steps illustrated in FIG. 8B to FIG. 14B, and manufacture of a product having a cross section taken along line Vb-Vb illustrated in FIG. 2 is described with reference to the steps illustrated in FIG. 8C to FIG. 14C.

Figure 8A:
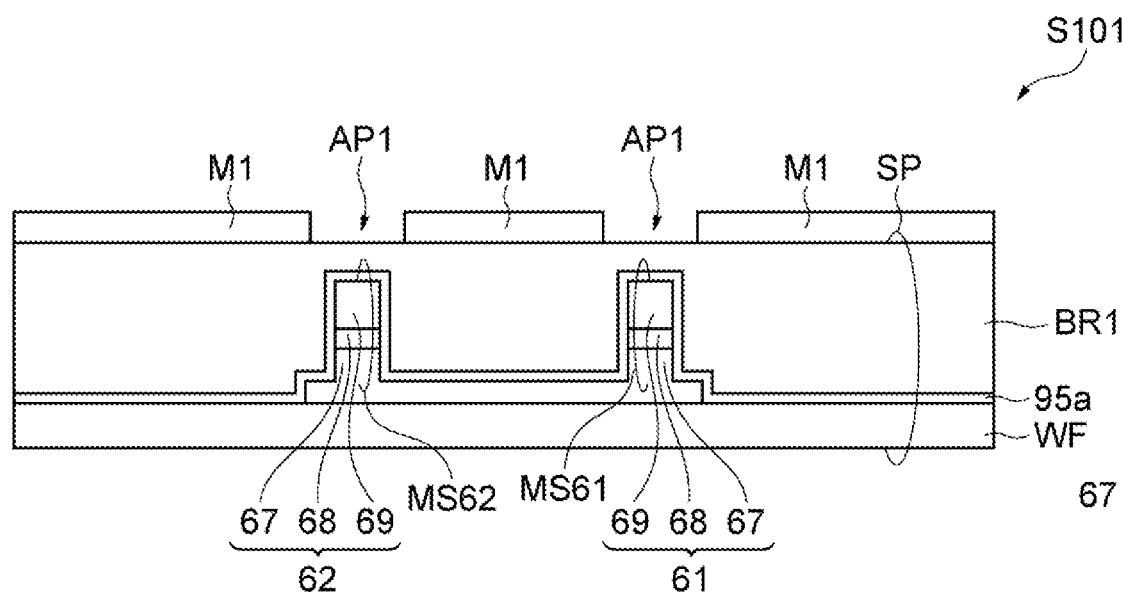
FIG. 8A, FIG. 8B, and FIG. 8C schematically illustrate a main step in a method for manufacturing a Mach-Zehnder modulator according to an embodiment.
Figure 8B:
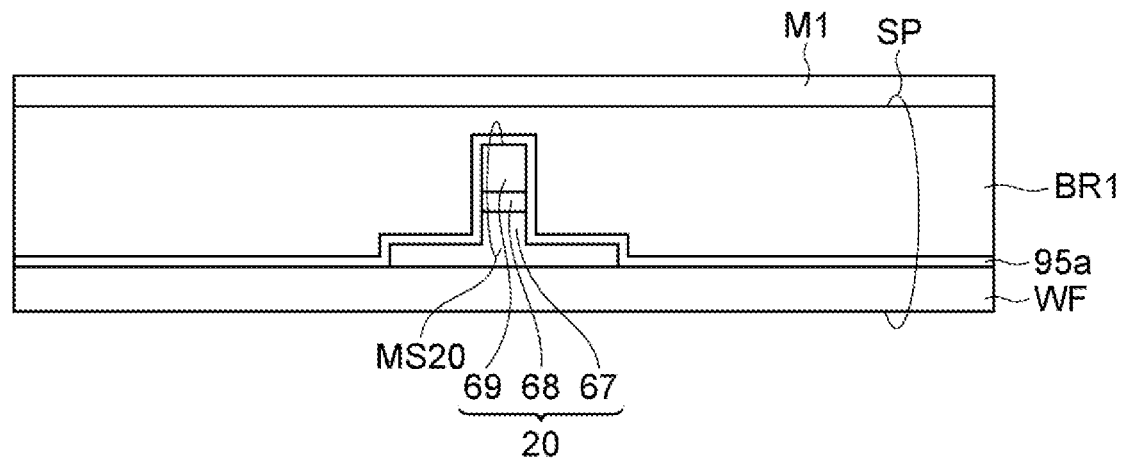
Figure 8C:
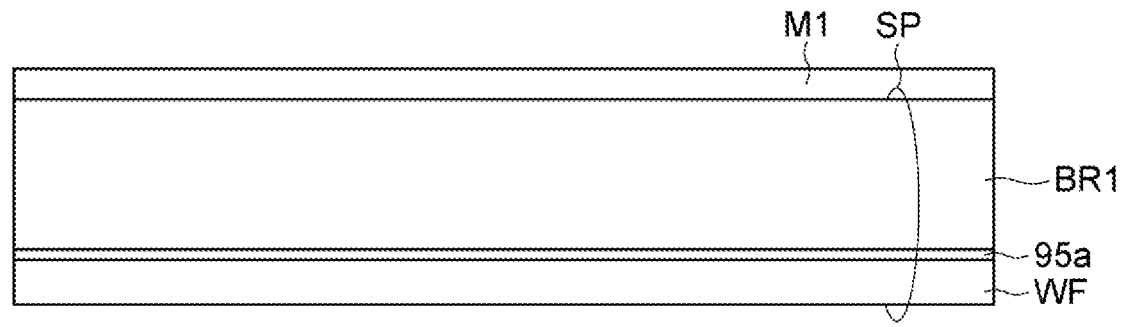

In step S101, as illustrated in FIG. 8A, FIG. 8B, and FIG. 8C, a semiconductor product SP is prepared. The semiconductor product SP includes a substrate WF, the optical waveguide 20, the first arm waveguide 61, the second arm waveguide 62, the lower embedded area BR1, and a first inorganic insulator film 95a. The optical waveguide 20, the second arm waveguide 62, and the lower embedded area BR1 are disposed on the substrate WF. The first inorganic insulator film 95a covers the optical waveguide 20, the first arm waveguide 61, and the second arm waveguide 62. Each of the optical waveguide 20, the first arm waveguide 61, and the second arm waveguide 62 includes a first conductive semiconductor layer 67, the core layer 68, and the second conductive semiconductor layer 69, which are disposed on the substrate WF. The lower embedded area BR1 covers the first inorganic insulator film 95a, the optical waveguide 20, the first arm waveguide 61, and the second arm waveguide 62 on the substrate WF.

After the semiconductor product SP is prepared, a first mask M1 is formed on the semiconductor product SP. The first mask M1 includes first openings AP1, located over semiconductor mesas for the first arm waveguide 61 and the second arm waveguide 62. The first mask M1 contains a silicon-based inorganic substance.

The semiconductor product SP is manufactured in the following manner.

A semiconductor multilayer is formed on the substrate WF of the semi-insulating InP by growing semiconductor layers for the first conductive semiconductor layer 67, the core layer 68, and the second conductive semiconductor layer 69 on the substrate WF. These semiconductor layers may be formed by, for example, organic metal vapor deposition or molecular beam epitaxy. The semiconductor layer for the first conductive semiconductor layer 67 is formed from an n-InP layer. The semiconductor layer for the core layer 68 is formed from an AlGaInAs layer. The semiconductor layer for the second conductive semiconductor layer 69 is formed from a p-InP layer.

The semiconductor multilayer is processed to form semiconductor mesas (MS20, MS61, and MS62) for the optical waveguide 20, the first arm waveguide 61, and the second arm waveguide 62 by photolithography and etching.

In addition, the semiconductor multilayer is processed for isolation by photolithography and etching.

After the above processing, the first inorganic insulator film 95a is formed on the entire surface of the substrate WF. The first inorganic insulator film 95a contains a silicon-based inorganic substance such as $SiO_2$, SiON, or SiN. The lower embedded area BR1 is formed on the first inorganic insulator film 95a. The lower embedded area BR1 contains a resin material, which includes, for example, BCB or polyimide.

Figure 9A:
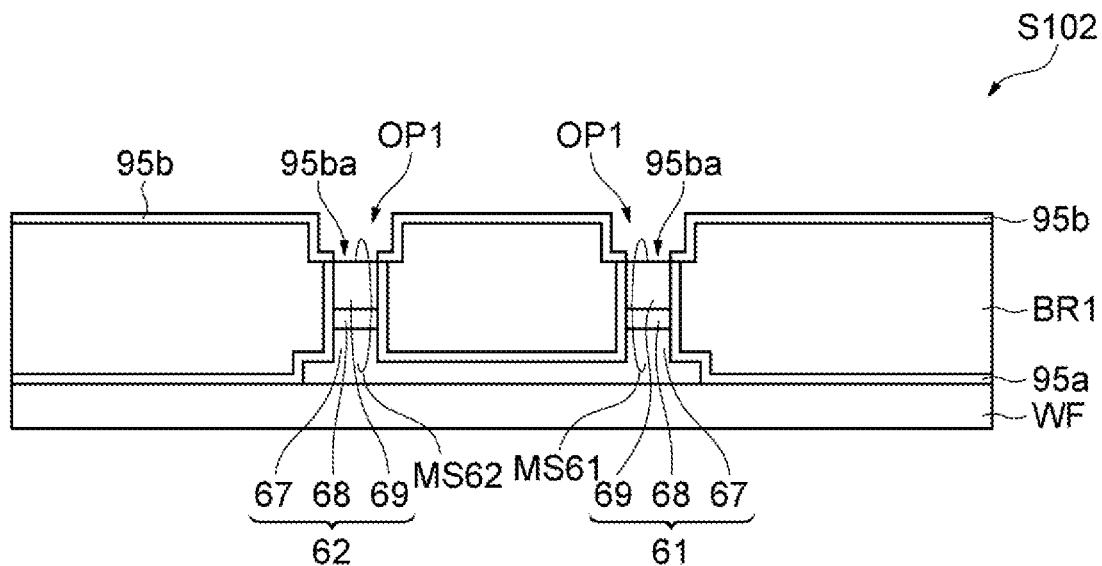
FIG. 9A, FIG. 9B, and FIG. 9C schematically illustrate a main step in a method for manufacturing a Mach-Zehnder modulator according to an embodiment.
Figure 9B:
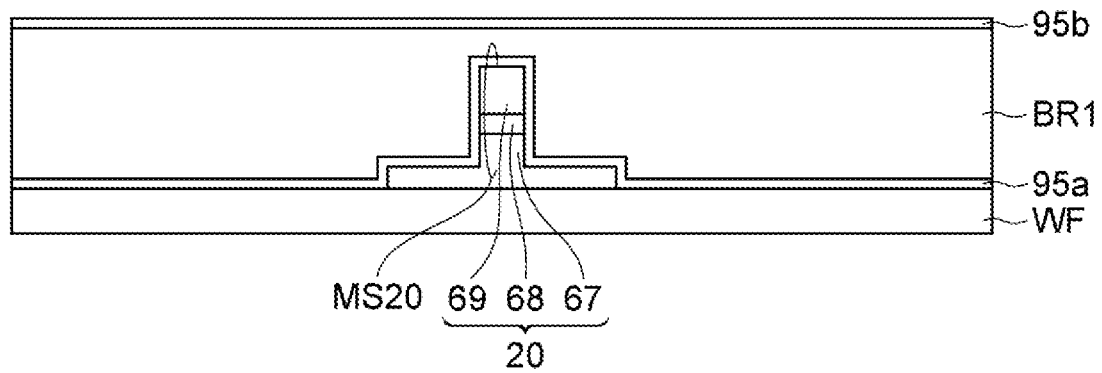
Figure 9C:
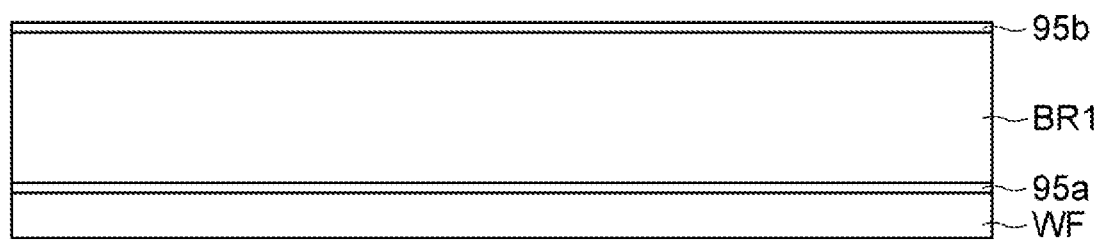

In step S102, as illustrated in FIG. 9A, FIG. 9B, and FIG. 9C, the lower embedded area BR1 is etched using the first mask M1. In the present embodiment, portions of the lower embedded area BR1 corresponding to the first openings AP1 of the first mask M1 are etched to form openings OP1, which reach the first arm waveguide 61 and the second arm waveguide 62, in the lower embedded area BR1. After the etching, the first mask M1 is removed.

After the first mask M1 is removed, an inorganic film for a second inorganic insulator film 95b is deposited on the entire surface of the substrate WF. The inorganic film contains a silicon-based inorganic substance such as $SiO_2$, SiON, or SiN. After this deposition, the inorganic film in the openings OP1 is removed by photolithography and etching to form the second inorganic insulator film 95b. The second inorganic insulator film 95b has openings 95ba located above the first arm waveguide 61 and the second arm waveguide 62.

Figure 10A:
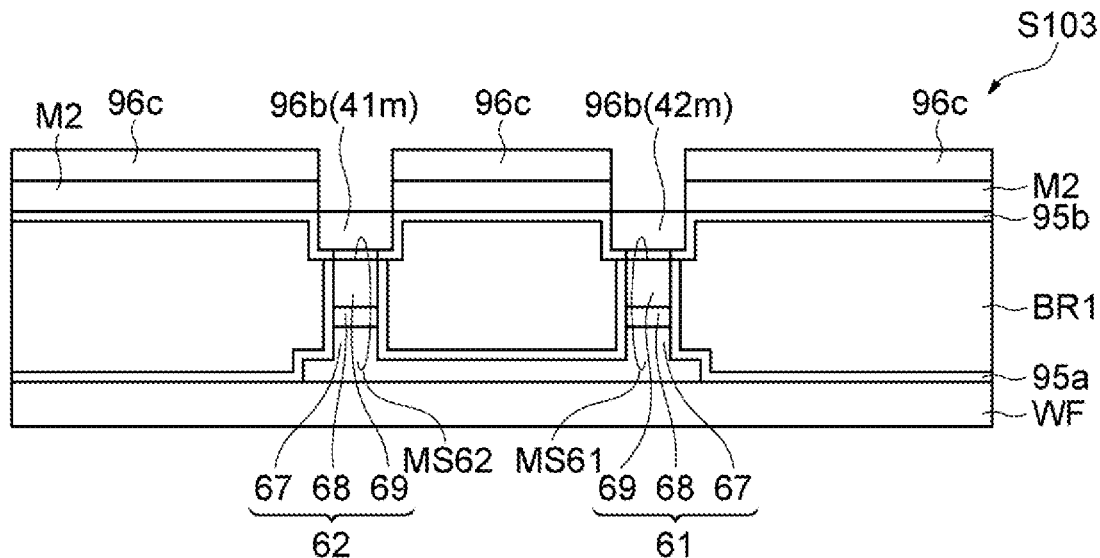
FIG. 10A, FIG. 10B, and FIG. 10C schematically illustrate a main step in a method for manufacturing a Mach-Zehnder modulator according to an embodiment.
Figure 10B:
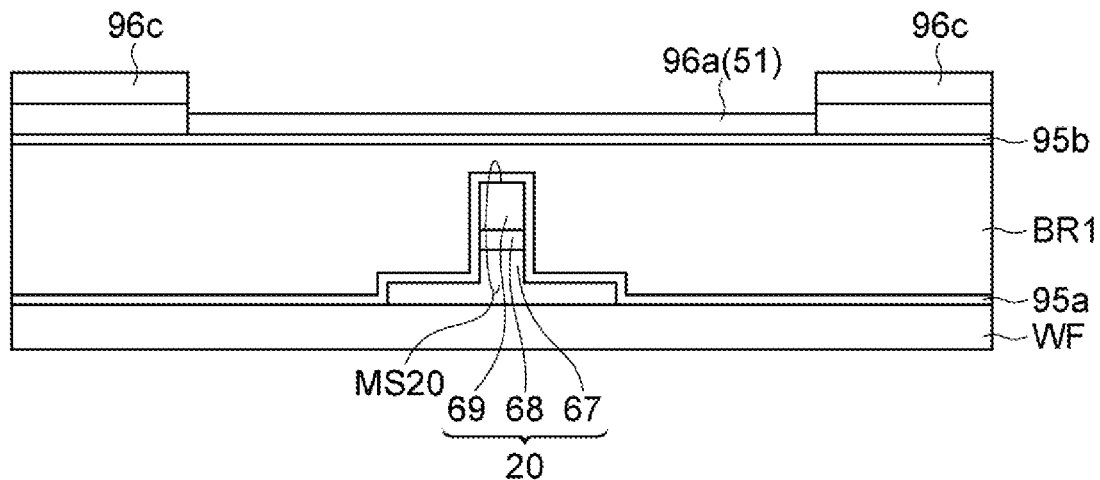
Figure 10C:
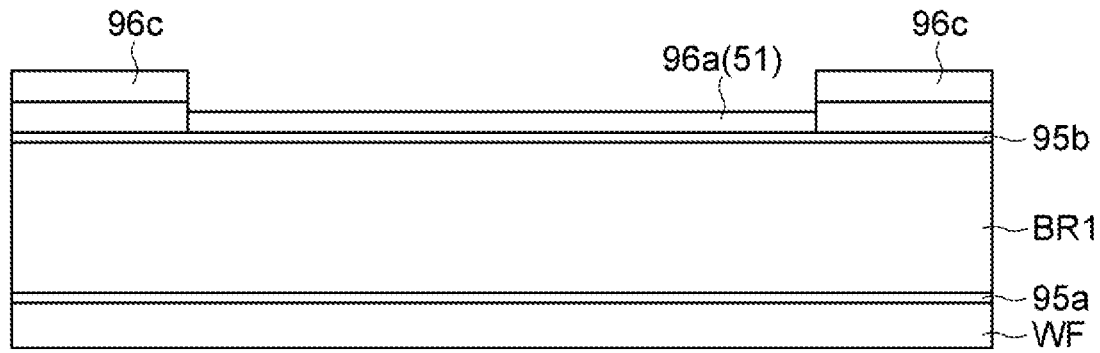

In step S103, after the second inorganic insulator film 95b is formed, as illustrated in FIG. 10A, FIG. 10B, and FIG. 10C, a second mask M2 is formed on the second inorganic insulator film 95b. The second mask M2 has a pattern that defines the first lower conductor 41m, the second lower conductor 42m, and the ground lower layer 51. The second mask M2 contains resin. In the present embodiment, the first lower conductor 41m, the second lower conductor 42m, and the ground lower layer 51 are manufactured by a lift-off method. The first lower conductor 41m and the second lower conductor 42m are respectively in contact with the upper surfaces of the first arm waveguide 61 and the second arm waveguide 62. Specifically, after the second mask M2 is formed, conductor layers (96a, 96b, and 96c) are deposited by vapor deposition of metal layers. When the second mask M2 is removed, a deposit 96c on the second mask M2 disappears, and the first lower conductor 41m, the second lower conductor 42m, and the ground lower layer 51 are formed from the conductor layers (96a and 96b).

Figure 11A:
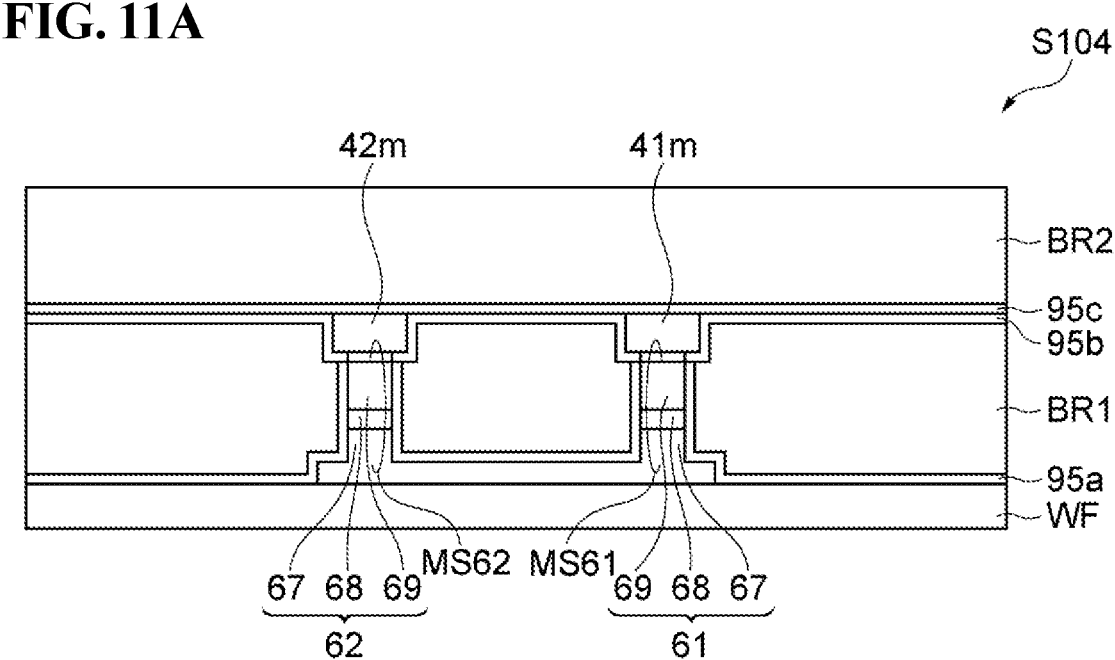
FIG. 11A, FIG. 11B, and FIG. 11C schematically illustrate a main step in a method for manufacturing a Mach-Zehnder modulator according to an embodiment.
Figure 11B:
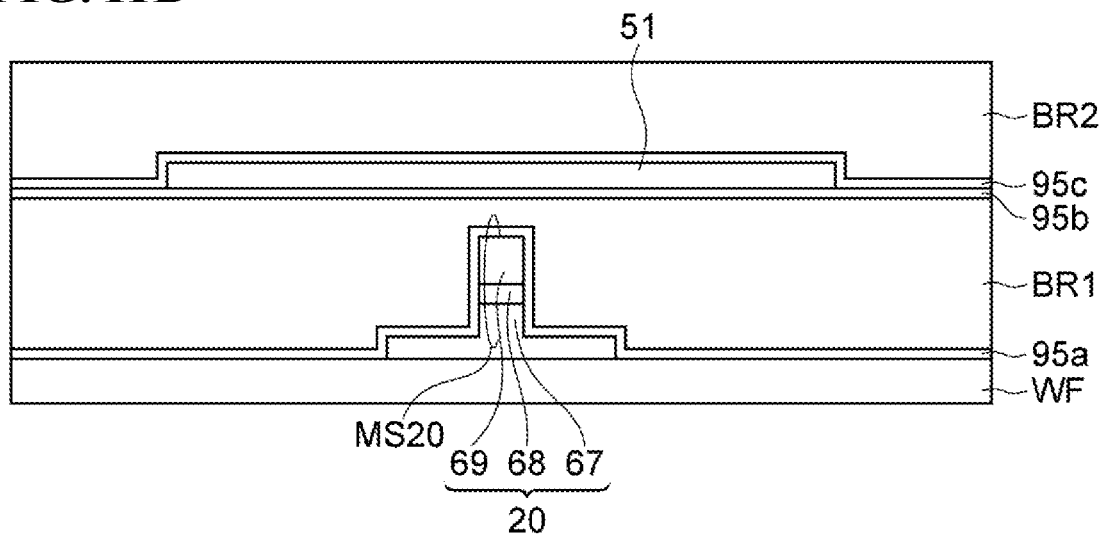
Figure 11C:
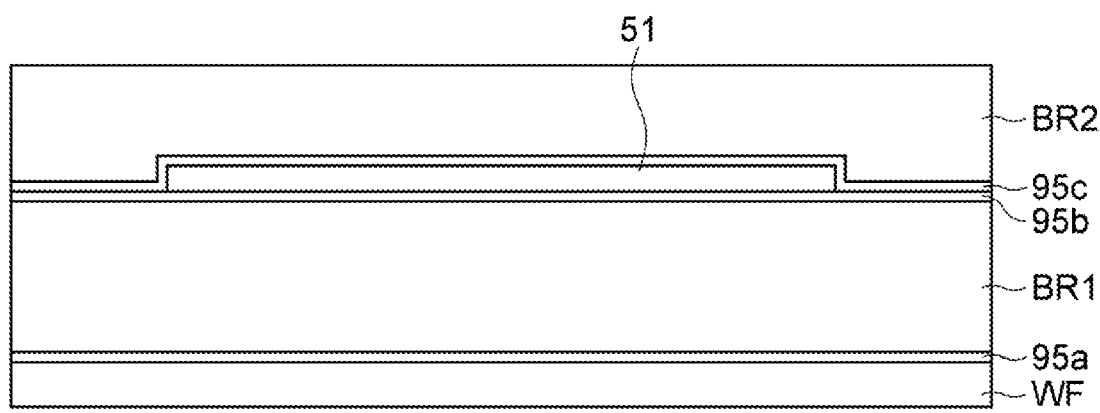

In step S104, as illustrated in FIG. 11A, FIG. 11B, and FIG. 11C, a third inorganic insulator film 95c is formed on the first lower conductor 41m, the second lower conductor 42m, the ground lower layer 51, and the second inorganic insulator film 95b, and an upper embedded area BR2 is formed on the third inorganic insulator film 95c. The third inorganic insulator film 95c is manufactured by chemical vapor deposition. The third inorganic insulator film 95c contains a silicon-based inorganic substance such as $SiO_2$, SiON, or SiN. The upper embedded area BR2 contains resin, which includes, for example, BCB or polyimide.

Figure 12A:
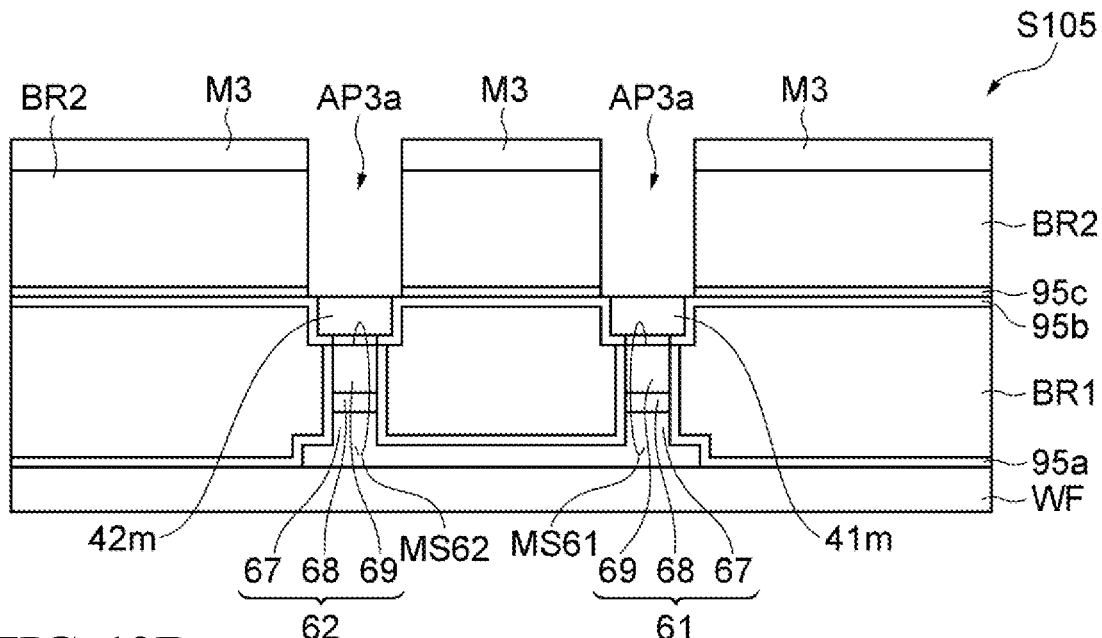
FIG. 12A, FIG. 12B, and FIG. 12C schematically illustrate a main step in a method for manufacturing a Mach-Zehnder modulator according to an embodiment.
Figure 12B:
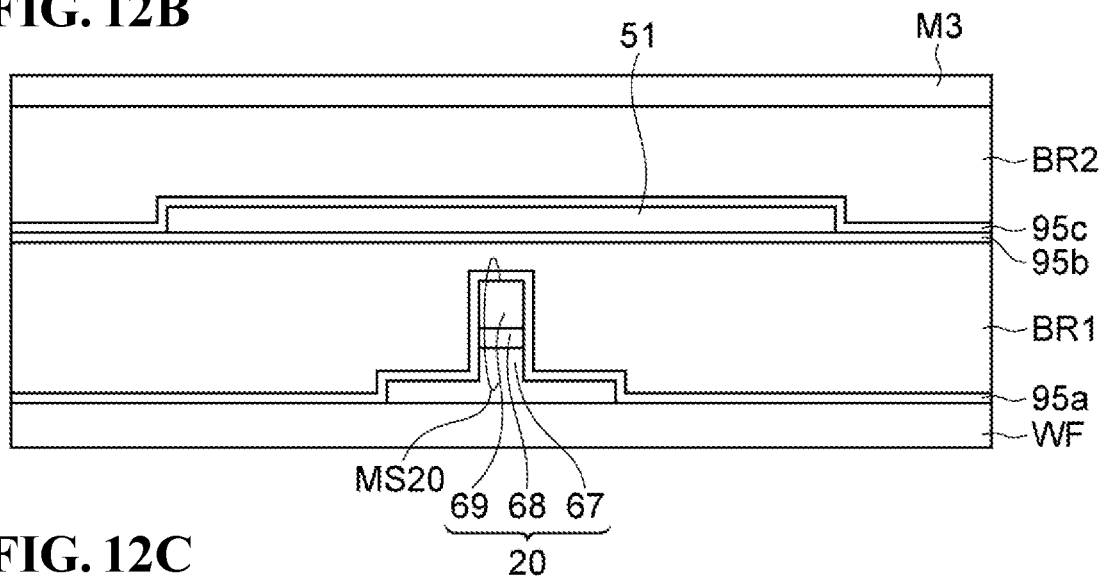
Figure 12C:
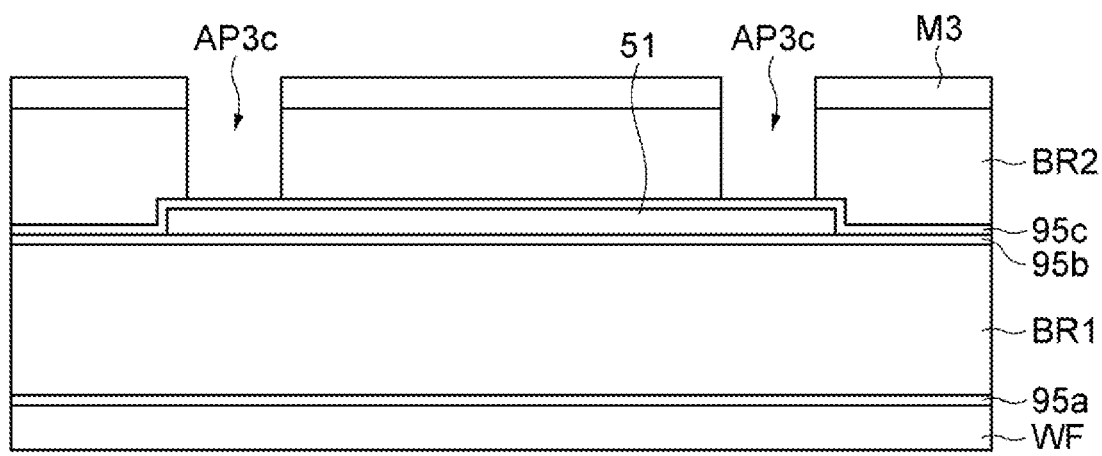

In step S105, as illustrated in FIG. 12A, FIG. 12B, and FIG. 12C, a third mask M3 is formed on the upper embedded area BR2. The third mask M3 defines contact openings that allow contact to the first lower conductor 41m of the first arm waveguide 61 and the second lower conductor 42m of the second arm waveguide 62, and contact openings that allows contact to the ground lower layer 51. The upper embedded area BR2 is etched using the third mask M3 to form third openings AP3a and AP3c in the upper embedded area BR2. The third openings AP3a are located over the first lower conductor 41m of the first arm waveguide 61 and the second lower conductor 42m of the second arm waveguide 62. The third openings AP3c are located over the ground lower layer 51. After the etching, the third mask M3 is removed.

Figure 13A:
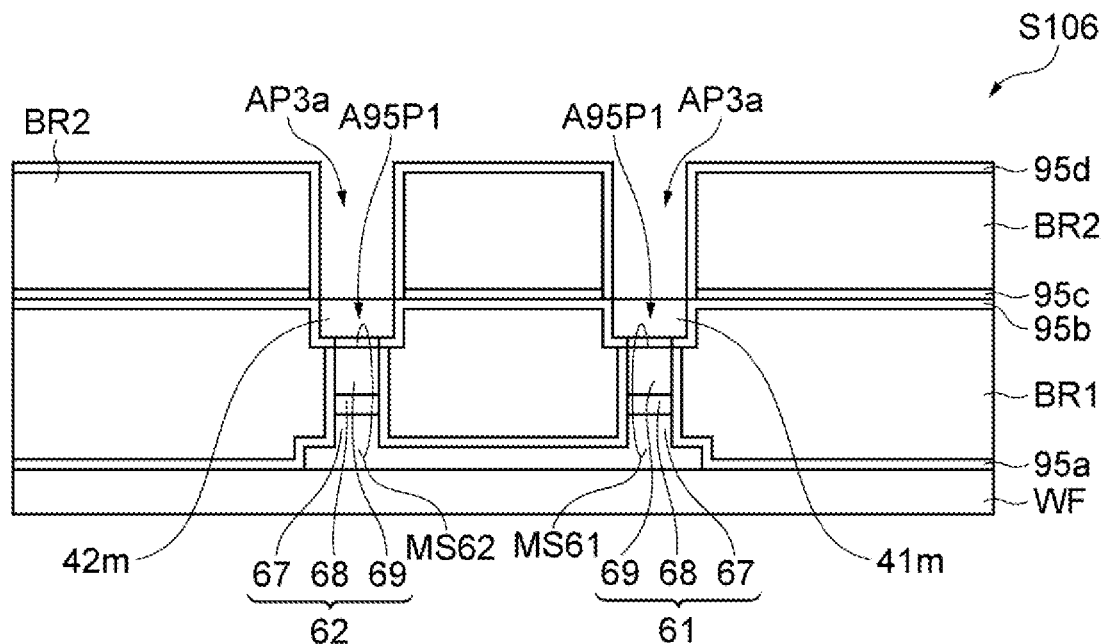
FIG. 13A, FIG. 13B, and FIG. 13C schematically illustrate a main step in a method for manufacturing a Mach-Zehnder modulator according to an embodiment.
Figure 13B:
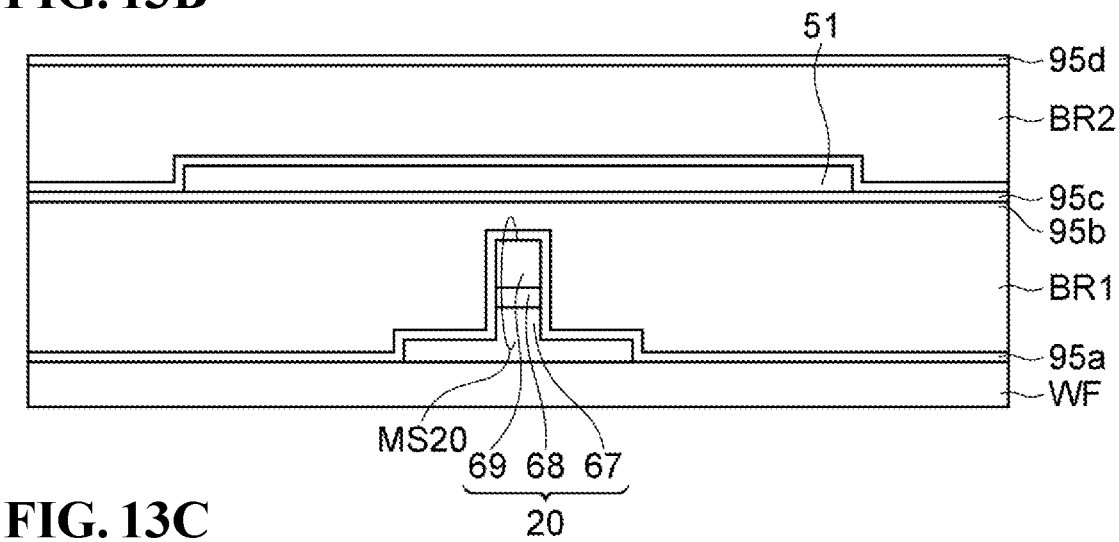
Figure 13C:
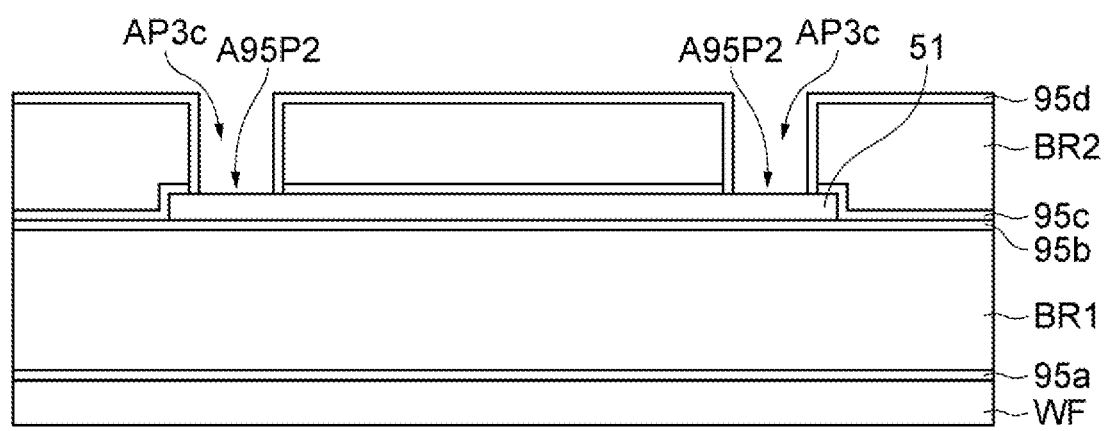

In step S106, after the upper embedded area BR2 including the third openings AP3a and AP3c is formed, as illustrated in FIG. 13A, FIG. 13B, and FIG. 13C, an inorganic insulator film for a fourth inorganic insulator film 95d is deposited on the entire surface of the substrate WF by chemical vapor deposition. By photolithography and etching, the fourth inorganic insulator film 95d on the bottom surfaces of the third openings AP3a and AP3c of the upper embedded area BR2 is removed to form openings A95P1 and A95P2, which reach the surfaces of the first lower conductor 41m, the second lower conductor 42m, and the ground lower layer 51, in the fourth inorganic insulator film 95d. The fourth inorganic insulator film 95d covers the upper surface of the upper embedded area BR2 and the side surfaces of the third openings AP3a and AP3c. The fourth inorganic insulator film 95d contains a silicon-based inorganic substance, such as $SiO_2$, SiON, or SiN.

Figure 14A:
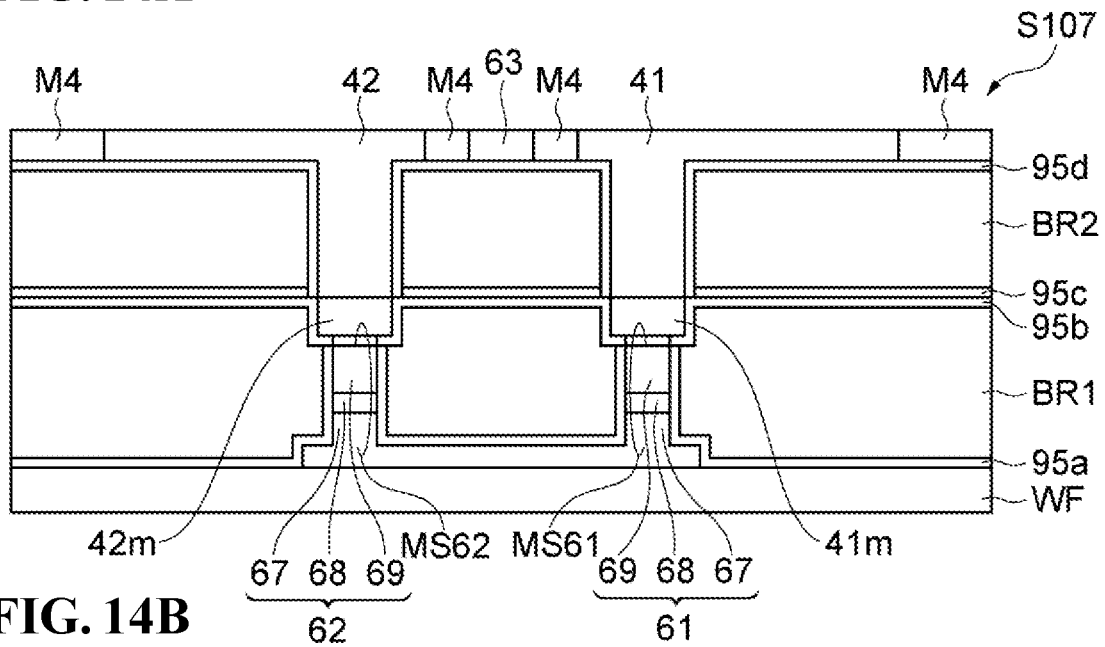
FIG. 14A, FIG. 14B, and FIG. 14C schematically illustrate a main step in a method for manufacturing a Mach-Zehnder modulator according to an embodiment.
Figure 14B:
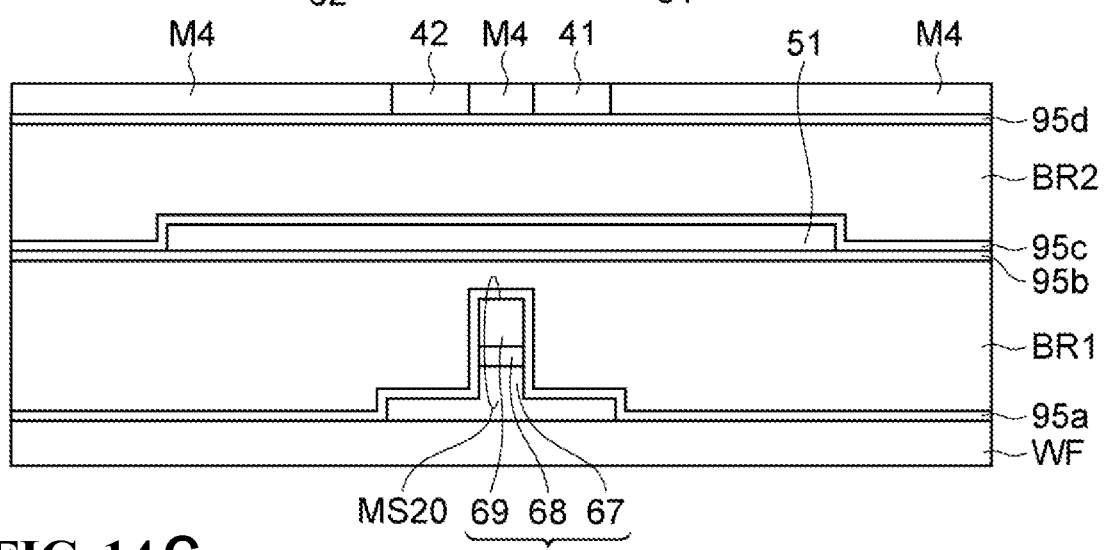
Figure 14C:
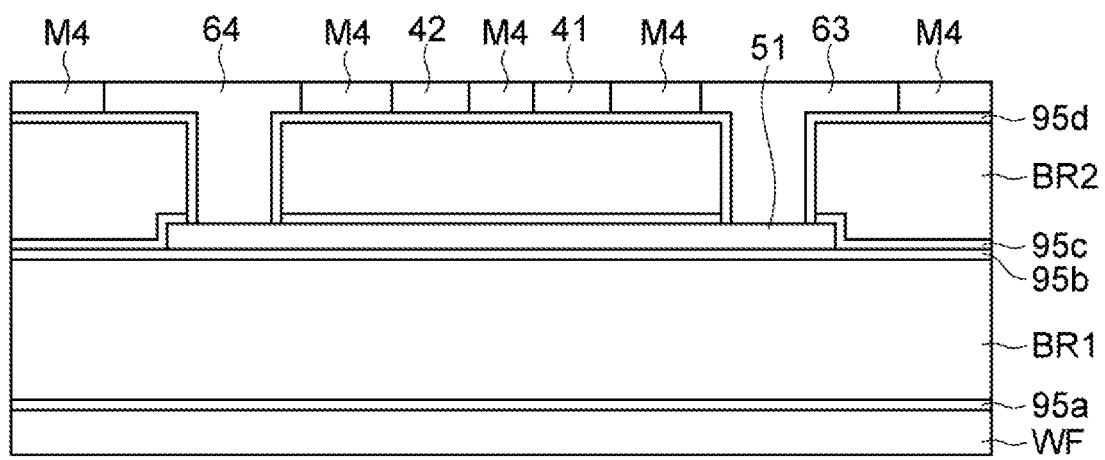

In step S107, as illustrated in FIG. 14A, FIG. 14B, and FIG. 14C, after the third openings AP3a and AP3c and the fourth inorganic insulator film 95d are formed, a fourth mask M4 is formed. The fourth mask M4 has a pattern that defines the first ground upper layer 43, the second ground upper layer 44, the first signal upper layer 41, the second signal upper layer 42, and the first conductive upper layer 63. By plating or a lift-off method using the fourth mask M4, metal layers are formed by patterning, specifically, the first ground upper layer 43, the first signal upper layer 41, the second signal upper layer 42, and the second ground upper layer 44 are formed.

The Mach-Zehnder modulator 1 is complete through these steps.

The principle of the present invention has been described using preferred embodiments with reference to the drawings. However, persons having ordinary skill in the art understand that the present invention can be changed in arrangement or other details without departing from such principle. The present invention is not limited to a specific structure disclosed in the embodiments. Thus, the scope of claims and all the modifications and changes derived from the scope of the spirit thereof are claimed.

What is claimed is:

1. A Mach-Zehnder modulator, comprising:
    an optical waveguide;
    a first arm waveguide;
    a second arm waveguide;
    an embedded area;
    a conductive semiconductor layer having the first arm waveguide and the second arm waveguide mounted thereon, the conductive semiconductor layer being connected to the first arm waveguide and the second arm waveguide;
    a first signal upper layer extending over the embedded area and connected to the first arm waveguide;
    a second signal upper layer extending over the embedded area and connected to the second arm waveguide;
    a first ground upper layer extending over the embedded area along at least one of the first signal upper layer and the second signal upper layer;
    a ground lower layer connected to the first ground upper layer and extending through the embedded area along the first signal upper layer and the second signal upper layer; and
    a first conductive upper layer connected to the ground lower layer and extending over the embedded area, along at least one of the first signal upper layer and the second signal upper layer,
    wherein the ground lower layer extends between the optical waveguide, the first signal upper layer, and the second signal upper layer.

2. The Mach-Zehnder modulator according to claim 1, wherein the ground lower layer has a width greater than a distance between the first signal upper layer and the second signal upper layer.

3. The Mach-Zehnder modulator according to claim 1, further comprising:
    a second ground upper layer,
    wherein the second ground upper layer extends over the embedded area along at least one of the first signal upper layer and the second signal upper layer,
    wherein the second ground upper layer is connected to the ground lower layer, together with the first ground upper layer,
    wherein the first ground upper layer, the first signal upper layer, the second signal upper layer, and the second ground upper layer are arranged in this order over the embedded area,
    wherein the first signal upper layer and the second signal upper layer are arranged over the embedded area, and the ground lower layer extends through the embedded area, and
    wherein the first signal upper layer, the first conductive upper layer, and the second signal upper layer are arranged in this order over the embedded area.

4. The Mach-Zehnder modulator according to claim 1, further comprising:
    a second ground upper layer; and
    a second conductive upper layer,
    wherein the second ground upper layer extends over the embedded area along at least one of the first signal upper layer and the second signal upper layer,
    wherein the second ground upper layer is connected to the ground lower layer, together with the first ground upper layer,
    wherein the second conductive upper layer is connected to the ground lower layer, together with the first conductive upper layer, and extends over the embedded area along at least one of the first signal upper layer and the second signal upper layer,
    wherein the first ground upper layer, the first signal upper layer, the second signal upper layer, and the second ground upper layer are arranged in this order over the embedded area,
    wherein the first signal upper layer and the second signal upper layer are arranged over the embedded area, and the ground lower layer extends through the embedded area, and
    wherein the first conductive upper layer, the first signal upper layer, the second signal upper layer, and the second conductive upper layer are arranged in this order over the embedded area.

5. The Mach-Zehnder modulator according to claim 1, further comprising:
    a second ground upper layer;
    a second conductive upper layer; and
    a third conductive upper layer,
    wherein the second ground upper layer extends over the embedded area along at least one of the first signal upper layer and the second signal upper layer,
    wherein the second ground upper layer is connected to the ground lower layer, together with the first ground upper layer,
    wherein the second conductive upper layer and the third conductive upper layer are connected to the ground lower layer, together with the first conductive upper layer, and extends over the embedded area along at least one of the first signal upper layer and the second signal upper layer,
    wherein the first ground upper layer, the first signal upper layer, the second signal upper layer, and the second ground upper layer are arranged in this order over the embedded area,
    wherein the first signal upper layer and the second signal upper layer are arranged over the embedded area, and the ground lower layer extends through the embedded area,
    wherein the first conductive upper layer, the first signal upper layer, the second conductive upper layer, the second signal upper layer, and the third conductive upper layer are arranged in this order over the embedded area.

* * * * *